(12) United States Patent
Stueve et al.

(10) Patent No.: US 11,730,162 B2
(45) Date of Patent: *Aug. 22, 2023

(54) METHODS AND SYSTEMS FOR CROP PEST MANAGEMENT UTILIZING GEOSPATIAL IMAGES AND MICROCLIMATE DATA

(71) Applicant: Ceres Imaging, Inc., Oakland, CA (US)

(72) Inventors: Kirk Stueve, Shafer, MN (US); Barclay Rogers, San Francisco, CA (US)

(73) Assignee: Ceres Imaging, Inc., Oakland, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/202,910

(22) Filed: Mar. 16, 2021

(65) Prior Publication Data

US 2021/0224967 A1 Jul. 22, 2021

Related U.S. Application Data

(63) Continuation of application No. 16/875,842, filed on May 15, 2020, now Pat. No. 10,957,036.

(Continued)

(51) Int. Cl.
*G06K 9/00* (2022.01)
*A01M 99/00* (2006.01)
(Continued)

(52) U.S. Cl.
CPC ............ *A01M 99/00* (2013.01); *A01G 25/16* (2013.01); *G06T 7/001* (2013.01); *G06V 10/764* (2022.01);
(Continued)

(58) Field of Classification Search
CPC .......... G06T 7/001; G06T 2207/10036; G06T 2207/20081; G06T 2207/20084;
(Continued)

(56) References Cited

U.S. PATENT DOCUMENTS 9,563,852 B1 2/2017 Wiles
10,182,214 B2 1/2019 Gornik
(Continued)

OTHER PUBLICATIONS

Aerobotics, "Grow with Aerobotics", Aerobotics.com, Jun. 13, 2019 (Retrieval date).
(Continued)

*Primary Examiner* — Samir A Ahmed
(74) *Attorney, Agent, or Firm* — Howard & Howard Attorneys PLLC

(57) ABSTRACT

Systems and methods for predicting pest susceptibility, comprising steps to receive geocoded geospatial image data of a crop field from sensors, receive microclimate data of the crop field, determine a degree of canopy closure for one or more portions of the crop field, and then generate a pest susceptibility index utilizing a risk model based on the degree of canopy closure and the microclimate data. The pest susceptibility index comprises a measure of a susceptibility of a crop in the crop field to one or more crop pests. In some embodiments, the method also comprises steps to generate a treatment plan (e.g., pesticide application) and to estimate an anticipated return on investment (ROI). The system therefore leverages remote-sensed data, machine data, analytics, and machine learning to enable farmers to predict, prevent, and control the outbreak of crop pests to greatest economic effect. Such a system addresses a fundamental problem in agriculture.

20 Claims, 15 Drawing Sheets

Related U.S. Application Data

(60) Provisional application No. 62/849,779, filed on May 17, 2019.

(51) Int. Cl.
| | |
|---|---|
| *G06T 7/00* | (2017.01) |
| *A01G 25/16* | (2006.01) |
| *G06V 10/764* | (2022.01) |
| *G06V 10/82* | (2022.01) |
| *G06V 20/10* | (2022.01) |

(52) U.S. Cl.
CPC ............ *G06V 10/82* (2022.01); *G06V 20/188* (2022.01); *G06T 2207/10036* (2013.01); *G06T 2207/20081* (2013.01); *G06T 2207/20084* (2013.01); *G06T 2207/30188* (2013.01)

(58) Field of Classification Search
CPC ........ G06T 2207/30188; G06T 7/0004; A01G 25/16; A01M 99/00; G06K 9/6282; G06V 10/764; G06V 10/82; G06V 20/188; G06Q 10/04; G06Q 50/02; G06F 18/24323
See application file for complete search history.

(56) References Cited

U.S. PATENT DOCUMENTS 10,957,036 B2 * 3/2021 Stueve .................... G06T 7/001
2017/0188521 A1 * 7/2017 Jagyasi .................. A01G 22/00

OTHER PUBLICATIONS

Archontoulis et al., "Iowa State Soybean Development Calculator", http://agron.iastate.edu/CroppingSystemsTools/soybean-decisions.html, May 2020 (retrieval date).

Boland et al., "Epidemiology of Sclerotinia Stem Rot of Soybean in Ontario", Phytopathology 78(9), Sep. 1988.

Halbert et al., "Effect of soybean canopy closure on landing rates of aphids with implications for restricting spread of soybean mosaic virus", Annals of Applied Biology 98, 1981.

Kamilaris et al., "Deep Learning in Agriculture: A Survey", Computers and Electronics in Agriculture 147, 2018.

Lamb et al., "Taranis Harvests $20M for Aerial Imaging Tech that Detects Crop Diseases", TheSpoon.Tech, Nov. 6, 2018.

Mulla et al., "Twenty Five Years of Remote Sensing in Precision Agriculture: Key Advances and Remaining Knowledge Gaps", Biosystems Engineering, Apr. 2013.

Patil, et al., "Forecasting disease spread to reduce crop losses", GeoMundus Conference, Universidade Nova de Lisboa, Dec. 7-8, 2018.

Taranis, "Who We Are", Taranis.ag, Jun. 13, 2019 (Retrieval date).

Willbur et al., "Validating Sclerotinia sclerotiorum Apothecial Models to Predict Sclerotinia Stem Rot in Soybean (Glycine max) Fields", Plant Disease, Oct. 18, 2018.

Willbur et al., "Weather-Based Models for Assessing the Risk of Sclerotinia sclerotiorum Apothecial Presence in Soybean (Glycine max) Fields", Plant Disease, Nov. 20, 2017.

Workneh et al., "Prevalence of Sclerotinia stem rot of soybeans in the north-central United States in relation to tillage, climate, and latitudinal positions", Phytopathology 90, 2000.

University of Wisconsin-Madison, "Sporecaster, The White Mold Forecaster," Last accessed on May 15, 2020. Available at https://ipcm.wisc.edu/apps/sporecaster/.

* cited by examiner

METHODS AND SYSTEMS FOR CROP PEST MANAGEMENT UTILIZING GEOSPATIAL IMAGES AND MICROCLIMATE DATA

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of automated crop measurements and pertain particularly to determinations of conditions which may be amenable to pest outbreaks in crop fields based upon geospatial image data and microclimate data.

BACKGROUND OF THE INVENTION

The statements in this section may serve as a background to help understand the invention and its application and uses, but may not constitute prior art.

*Sclerotinia* stem rot, also known as white mold, is among the top 10 diseases plaguing soybeans, and can cause major yield (and corresponding economic) losses. For example, in 2014, white mold triggered yield losses resulting in approximately $500 million in economic losses by soybean farmers in the U.S. White mold is primarily controlled through the application of fungicides and occasionally herbicides, especially during the period of soybean flowering (R1 to R3), as this is the period when the flowers are vulnerable to ascospores (produced from *S. sclerotiorum* apothecia) and environmental conditions are amenable to white mold development. White mold only develops when soybean flowering, apothecial germination, and weather conditions that are conducive for infection occur simultaneously (See, *Weather-Based Models for Assessing the Risk of Sclerotinia sclerotiorum Apothecial Presence in Soybean (Glycine max) Fields*, November 2017, Available at https://apsjournals.apsnet.org/doi/10.1094/PDIS-04-17-0504-RE.) Therefore, predicting white mold outbreaks from measured data would be highly advantageous.

More generally, managing agricultural inputs precisely, including chemicals to manage disease, is important for maximizing yield productivity while minimizing costs in some embodiments. Insufficient or mis-timed applications can lead to major yield losses and even crop death. However, unnecessary applications impose a large cost without any corresponding benefit and may have additional negative side effects. Understanding where and when to apply chemicals to manage disease is therefore a matter of high importance for farmers.

Crop pest management can be made more efficient by identifying which fields (or portions of fields) are likely to be prone to crop pest outbreak, including crop diseases, insects, weeds, and plant pathogens. Current practice involves time-intensive direct assessments of the field(s) to identify the presence of disease (at which point it may be too late to be treated effectively) or to make field observations suggesting a potential disease outbreak based upon the experience of the observer or other available heuristics. Such practices lack precision and may result in fields being treated when they should not be, fields not being treated when they should, or portions of fields either being treated or not without sound information on the presence or potential for an actual pest outbreak in the relevant area.

Even if growers or their advisors attempt to employ more predictive approaches, they are required to estimate certain measures (e.g., crop canopy closure) and to evaluate each field based upon specific criteria (e.g., row spacing). Such estimations lack accuracy as it is difficult, if not impossible, to obtain a reliable measure of canopy closure based upon ground-level observations. Furthermore, growers may lack records of key inputs (e.g., row spacing) or may enter any such inputs incorrectly, resulting in an inaccurate prediction.

The aforementioned difficulties result in unsatisfactory experiences for farmers as well as difficulties with crop pest management. The present invention was developed to address these and other difficulties, and to provide an automated method for determining when a pest outbreak is probable based upon specific and quantitative measures. Thus the invention enables farmers to better manage crop pests through applications of agricultural chemicals or other management techniques.

It is against this background that various embodiments of the present invention were developed.

BRIEF SUMMARY OF THE INVENTION

Embodiments of the present invention relate to automated crop measurements and pertain particularly to predication of pest susceptibility in crop fields based upon crop vigor maps determined from geospatial image data (e.g., aerial/satellite imagery), and microclimate data (i.e., locally variable environmental conditions such as temperature and humidity).

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later.

In one or more embodiments described herein, systems, computer-implemented methods, apparatuses and/or computer program products provide an automated method for determining when a pest outbreak in particular crop field(s) or portions thereof is probable based upon specific, quantitative measures. The system may include a non-transitory, computer-readable medium containing instructions and a processor that executes the instructions to perform various stages.

The present invention is directed to methods and systems for assessing field(s) of plants to determine, in a specific and quantitative manner based upon data and measurements, which field(s) or portions thereof exhibit characteristics corresponding to likely pest outbreak, and thus are good candidates for applications of agricultural chemicals or other management techniques to prevent the outbreak, or control the propagation, of crop pest(s). The primary users of this data are agricultural growers or their advisors (e.g., agronomists), who are able to receive data-driven assessments of which field(s) or portions thereof exhibit the conditions necessary for the outbreak of disease(s).

In short, the inventors have developed a process to predict where and when to employ agricultural management techniques (e.g., applications of specific chemicals such as fungicides) to the greatest effect to prevent the outbreak, or control the propagation, of crop pest(s). One application of this process is to white mold infestations in soybeans in the central and upper reaches of the United States Corn Belt.

Accordingly, one embodiment of the present invention is a system comprising a hardware processor and a non-transitory storage medium for storing program code, the program code executable by the hardware processor to execute a process for predicting a pest susceptibility, the program code when executed by the hardware processor causing the hardware processor to execute steps to: receive geospatial image data of a crop field from one or more sensors, wherein the geospatial image data of the crop field is geocoded by longitude and latitude coordinates; calculate a degree of canopy closure from the geospatial image data for one or more portions of the crop field; receive microclimate data of the crop field, wherein the microclimate data comprises locally variable environmental conditions in the one or more portions of the crop field; and generate a pest susceptibility index in the one or more portions of the crop field from the geospatial image data utilizing a risk model, wherein the pest susceptibility index is generated based on both the degree of canopy closure of the crop field and the microclimate data in the one or more portions of the crop field, wherein the pest susceptibility index is a measure of a susceptibility of a crop in the crop field to one or more crop pests.

In one embodiment of the invention, the calculating a degree of canopy closure from the geospatial image data for the one or more portions of the crop field utilizes a first machine vision algorithm executable by the hardware processor.

In one embodiment of this aspect, the first machine vision algorithm comprises one or more deep learning neural networks, and the deep learning neural networks are trained on ground truth data comprising geospatial image data of one or more sample crop fields and one or more degrees of canopy closure for the one or more sample crop fields.

In one embodiment of the invention, the degree of canopy closure for the one or more portions of the crop field is calculated using machine data received from agricultural equipment.

In another embodiment, the degree of canopy closure for the one or more portions of the crop field is calculated using a crop row spacing of the crop field, wherein the crop row spacing is estimated from the geospatial image data using a second machine vision algorithm or received from machine data from one or more agricultural equipment.

In yet another embodiment, the degree of canopy closure for the one or more portions of the crop field is calculated using an irrigation status of the crop field, wherein the irrigation status is estimated using geospatial image data or received from machine data from one or more irrigation equipment.

In another embodiment, the degree of canopy closure for the one or more portions of the crop field is calculated using a crop stage of the crop field, wherein the crop stage is determined from physical observation or one or more crop models.

In yet another embodiment of the invention, the risk model is a machine learning algorithm executable by the hardware processor, and the machine learning algorithm is trained on ground truth data comprising one or more sample pest data points and one or more sample degrees of canopy closure for one or more sample crop fields.

In one embodiment of this aspect, the machine learning algorithm comprises one or more of a linear regressor, a nonlinear regressor, a random forest algorithm, and a neural network.

In yet another embodiment of the invention, the crop pest is selected from the group consisting of crop diseases, insects, weeds, and plant pathogens.

In another embodiment, the geospatial image data is selected from the group consisting of aerial imagery, satellite imagery, and unmanned aircraft system (UAS) imagery, wherein the one or more sensors are infrared cameras.

In one embodiment, the one or more sensors are located on a machine selected from the group consisting of an unmanned aerial vehicle (UAV), an unmanned aircraft system (UAS), an aircraft, a satellite, and a field equipment.

In another embodiment, the microclimate data is generated from the group consisting of one or more in-field measurements, one or more aerial measurements, one or more satellite measurements, one or more drone measurements, one or more remote sensor measurements, one or more weather models, and one or more microclimate models.

In yet another embodiment, the program code further comprises steps to: generate a treatment plan based on the pest susceptibility index in the one or more portions of the crop field, wherein the treatment plan comprises an agricultural management technique, comprising application of one or more agricultural chemicals, to prevent outbreak or control propagation of one or more crop pests.

In one embodiment, the program code further comprises steps to: receive price information for a crop growing in the crop field, a cost information for one or more agricultural management techniques, and an anticipated efficacy for the one or more agricultural management techniques; and generate an anticipated return on investment (ROI) based on the price and cost information and the anticipated efficacy.

Another embodiment of the present invention is a non-transitory storage medium for storing program code, the program code executable by a hardware processor to execute a process for predicting a pest susceptibility of a crop field, the program code when executed by the hardware processor causing the hardware processor to execute the aforementioned steps.

Yet another embodiment of the present invention is a computer-implemented method for predicting a pest susceptibility, the computer-implemented method executable by a hardware processor, the method comprising: receiving geospatial image data of a crop field from one or more sensors, wherein the geospatial image data of the crop field is geocoded by longitude and latitude coordinates; calculating a degree of canopy closure from the geospatial image data for one or more portions of the crop field; receiving microclimate data of the crop field, wherein the microclimate data comprises locally variable environmental conditions in the one or more portions of the crop field; and generating a pest susceptibility index in the one or more portions of the crop field from the geospatial image data utilizing a risk model, wherein the pest susceptibility index is generated based on both the degree of canopy closure of the crop field and the microclimate data in the one or more portions of the crop field, wherein the pest susceptibility index is a measure of a susceptibility of a crop in the crop field to one or more crop pests.

In one embodiment, the calculating a degree of canopy closure from the geospatial image data for the one or more portions of the crop field utilizes a first machine vision algorithm executable by the hardware processor.

In one embodiment of this aspect, the first machine vision algorithm comprises one or more deep learning neural networks, wherein the deep learning neural networks are trained on ground truth data comprising geospatial image data of one or more sample crop fields and one or more degrees of canopy closure for the one or more sample crop fields.

In one embodiment, the degree of canopy closure for the one or more portions of the crop field is calculated using machine data received from agricultural equipment.

In one embodiment, the degree of canopy closure for the one or more portions of the crop field is calculated using a crop row spacing of the crop field, wherein the crop row spacing is estimated from the geospatial image data using a second machine vision algorithm or received from machine data from one or more agricultural equipment.

Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

Features from any of the embodiments described herein may be used in combination with one another in accordance with the general principles described herein. The details of one or more embodiments of the subject matter described herein are set forth in the accompanying drawings and the description below. These and other aspects of the invention will become apparent from the following description of the preferred embodiments, drawings, and claims.

BRIEF DESCRIPTION OF THE DRAWINGS

Embodiments of the present invention described herein are exemplary, and not restrictive. Embodiments will now be described, by way of examples, with reference to the accompanying drawings, in which.

Figure 1A:
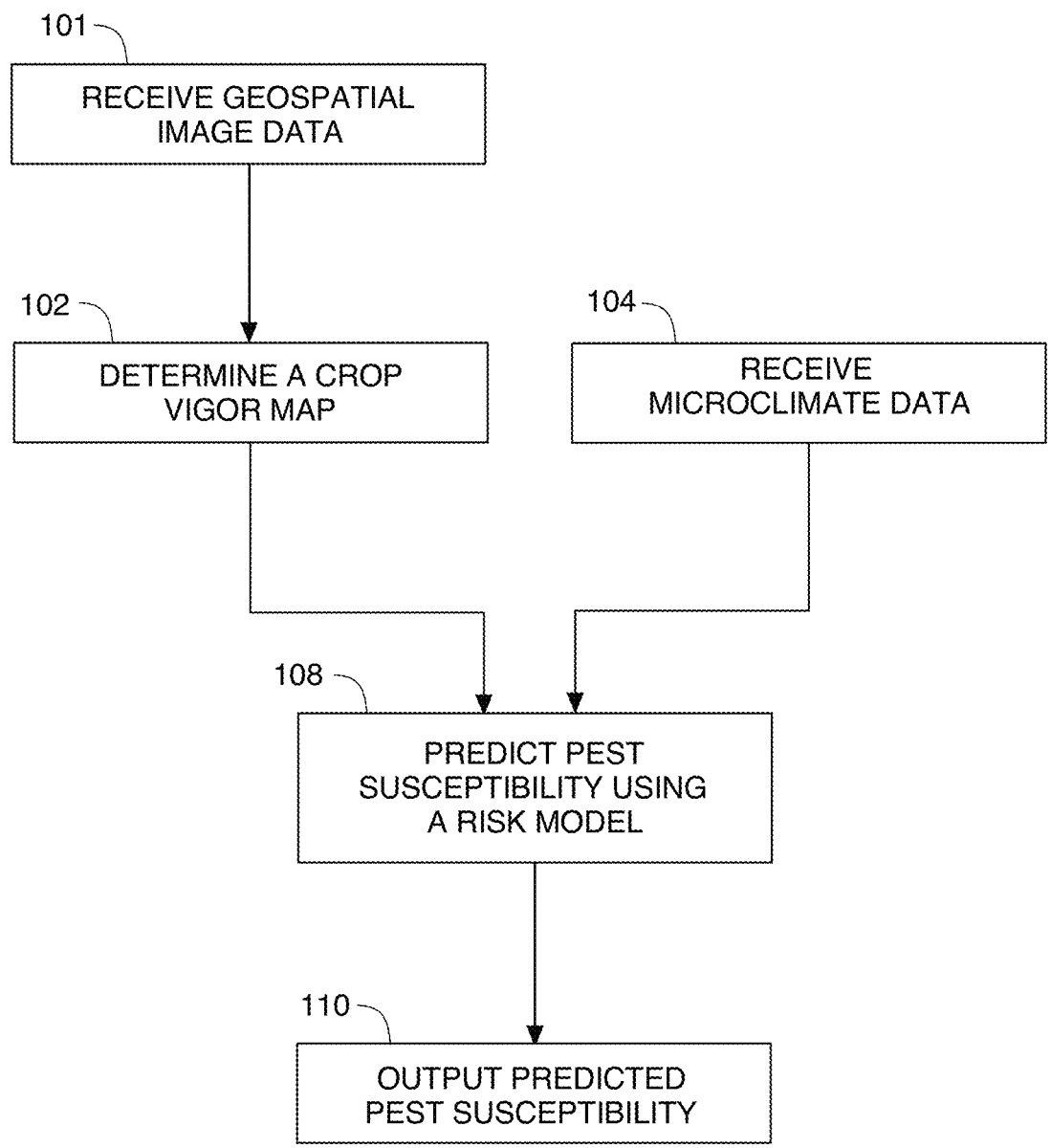
FIG. 1A shows an illustrative flowchart of a process for pest susceptibility prediction, in accordance with one embodiment of the present invention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to refer to examples with no indication of quality level. Like numbers refer to like elements throughout.

The terms "crop field," "field," "plant," and "field of plant(s)" as used herein are generic to any field, orchard, patch, or other cultivated land, and any type of plant growing thereon.

The terms "CERES" and "CERES IMAGING" are trademark names carrying embodiments of the present invention, and hence, the aforementioned trademark names may be interchangeably used in the specification and drawing to refer to the products/services offered by embodiments of the present invention. The term CERES may be used in this specification to describe the overall platform, as well as the company providing said platform. With reference to the figures, embodiments of the present invention are now described in detail.

Overview

Figure 1B:
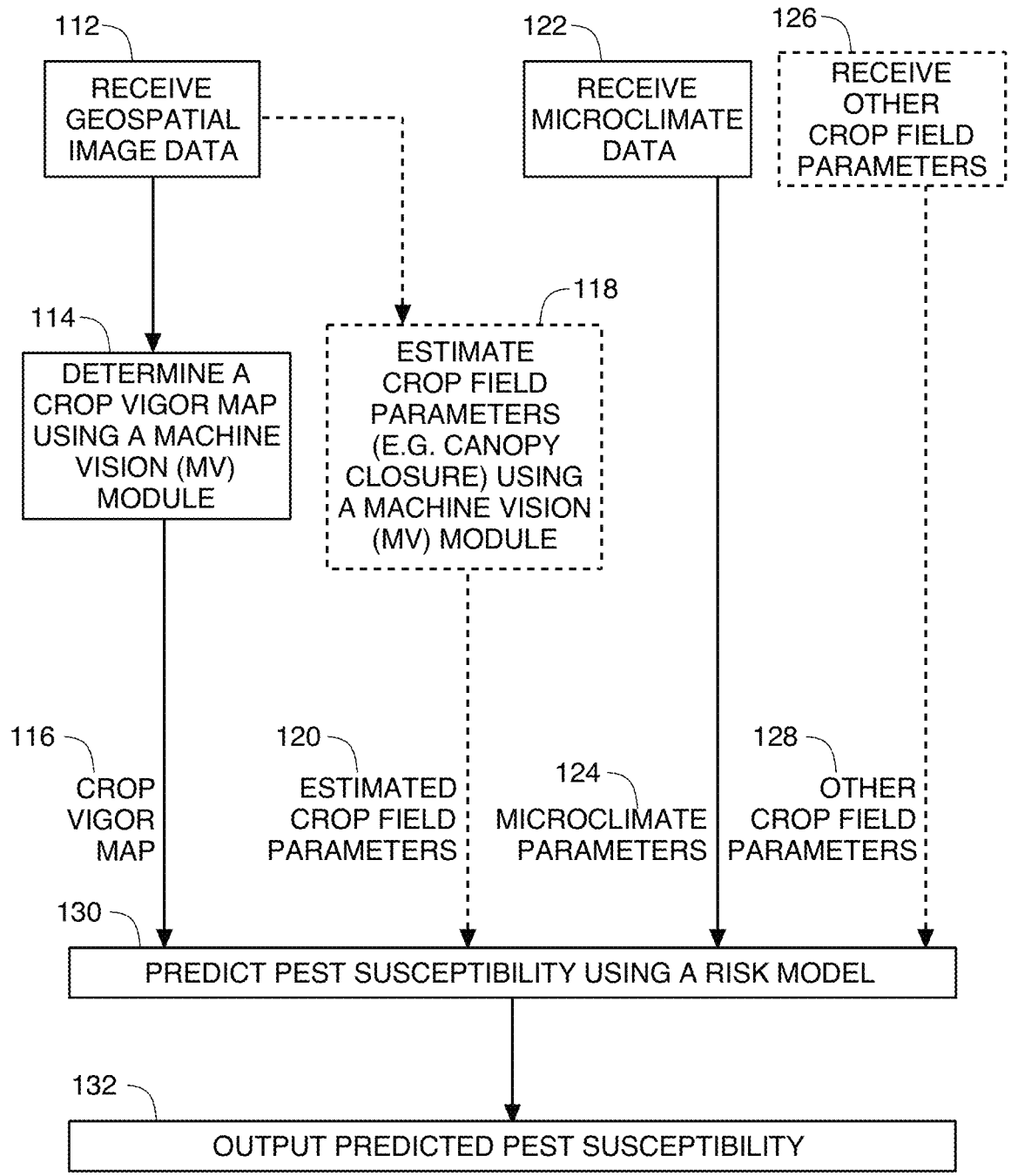
FIG. 1B shows another illustrative flowchart of a process for pest susceptibility prediction, in accordance with another embodiment of the present invention.

FIGS. 1A and 1B present an overview of the present invention, in accordance to embodiments of the present invention. FIG. 1A shows an illustrative flowchart of a process for pest susceptibility prediction, in accordance with one embodiment of the present invention. The process begins at step 101, where the process receives geospatial image data, where geospatial image data is defined as sensor and machine data that is geocoded according to a coordinate system (e.g., by longitude and latitude coordinates). In other words, the geospatial image data is mapped to geolocations of the crop field.

The geocoded image data received at step 101 may include aerial imagery, satellite imagery, unmanned aircraft system (UAS), imagery from infrared or visible-band cameras. The sensors providing the geocoded image data may be located on a machine such as unmanned aerial vehicle (UAV), an unmanned aircraft system (UAS), an aircraft, a satellite, or a field equipment.

At step 102, the process determines a crop vigor map from the geospatial image data, where the crop vigor map comprises at least one crop vigor index that is mapped to at least one geolocation of the crop field. The crop vigor index is a numerical index indicating crop health or density and may be calculated based on the foliage volume, density, layout, and/or health status of the plants in the crop field.

Figure 7:
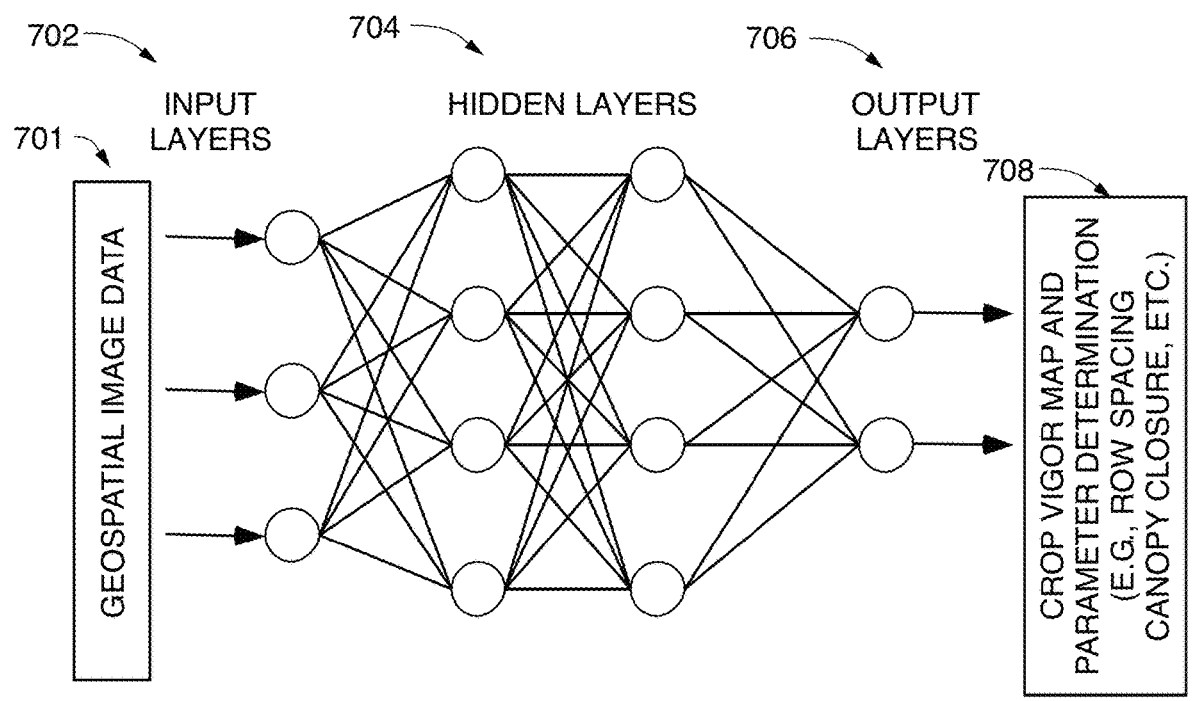
FIG. 7 shows an illustrative block diagram of a convolutional neural network (CNN) for geospatial image data analysis using a machine vision module, in accordance with one embodiment of the invention.

In one embodiment of the present invention, the crop vigor index is determined utilizing a machine vision algorithm executable by a hardware processor, as described in further detail in FIG. 7. In another embodiment, the crop vigor index is calculated from one or more crop vigor indicator equations using the geospatial image data and the microclimate data as input. Crop vigor indicators and microclimate data are discussed in more detail below.

At step 104, the process receives microclimate data, where microclimate data comprises locally variable environmental conditions from at least one geolocation of the crop field.

Microclimate parameters extracted from the microclimate data may include temperature and humidity, as described in FIG. 2 below. In one embodiment of the present invention, the microclimate data is a microclimate map comprising at least one microclimate parameter mapped to at least one geolocation of the crop field.

In one embodiment, the microclimate map may also be generated through one or more microclimate models. Microclimate models are used to simulate locally variable environmental conditions when direct measurements are difficult to obtain. For example, a Euclidean distance-based model is a model that can be used to map parts of a field that are close to a windbreak, leading to cooler and wetter conditions compared to other parts of the field. Solar radiation exposure-based model is another model that considers topography and sun position to quantify cool and wet shaded slopes versus warm and dry exposed slopes during critical parts of the growing season. Microclimate parameters are further discussed below.

At step 108, the process applies a risk model to generate a pest susceptibility map based on the received crop vigor map 102 and microclimate data 104, where the pest susceptibility map comprises at least one pest susceptibility index mapped to at least one geolocation of the crop field. The pest susceptibility index is a measure of a susceptibility of a crop in the crop field to one or more crop pests, where crop pests include crop diseases, insects, weeds, plant pathogens, and so one.

Figure 8:
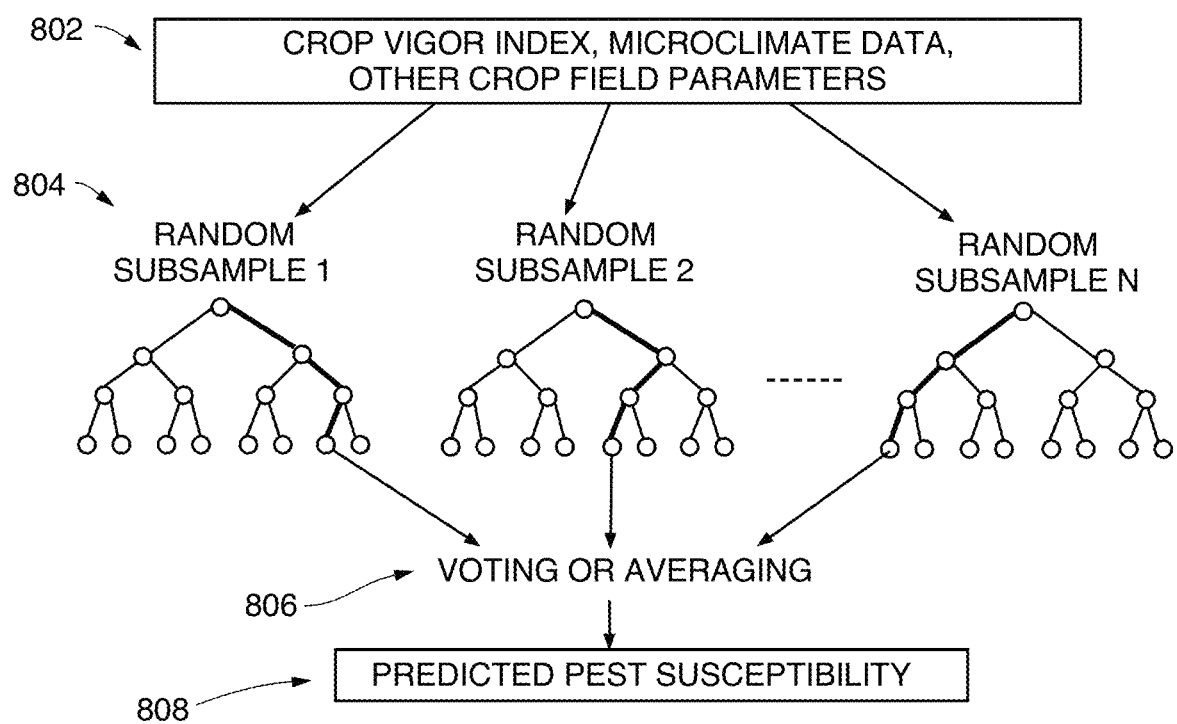
FIG. 8 shows an illustrative block diagram for a machine learning algorithm using random forest regressors, in accordance with another embodiment of the invention.

In one embodiment, the risk model is a machine learning algorithm executable by the hardware processor, as described in further detail in FIG. 8. In some embodiments, the risk model utilizes other crop field parameters in addition to the crop vigor map and microclimate data to generate the pest susceptibility map, as shown in FIG. 1B. Finally, the process outputs the predicted pest susceptibility at step 110. The risk model is further discussed below.

FIG. 1B shows another illustrative flowchart of a process for pest susceptibility prediction, in accordance with another embodiment of the present invention. The process begins at step 112, where the process receives geospatial image data. At step 114, the process determines a crop vigor map 116 from the geospatial image data utilizing a first machine vision algorithm executable by a hardware processor. At step 122, the process receives microclimate data, where microclimate data comprises locally variable environmental conditions from at least one geolocation of the crop field. The process extracts microclimate parameters 124 from the microclimate data, as described in FIG. 2.

At step 118, the process optionally estimates one or more crop field parameters (e.g., canopy closure) 120 based on the geospatial image data utilizing a second machine vision algorithm executable by the hardware processor. The machine vision algorithms used to determine the crop vigor map and the crop field parameters are described in further detail in FIG. 7. Other crop field parameters 128 may also optionally be received by the process as shown in step 126. In one embodiment, the other crop field parameters 128 are machine data received from agricultural equipment or other equipment in or near the field.

The crop field parameters estimated in step 118 or received in step 126 may include the crop row spacing at one or more geolocations of the crop field, the irrigation status, the degree of canopy closure, or the crop stage, each estimated 120 or received 128 for one or more geolocations of the crop field. In one embodiment, the irrigation status may be estimated using geospatial image data and/or received from machine data from one or more irrigation equipment. In one embodiment, the degree of canopy closure may be estimated from the geospatial image data using the same machine vision algorithm used in step 114. In one embodiment, the crop stage may be determined from physical observation and/or one or more crop models, as discussed in further detail below.

At step 130, the process applies a risk model to predict pest susceptibility based on the crop vigor map 116, the estimated crop field parameters 120, the microclimate parameters 124, and the other crop field parameters 128, where the predicted pest susceptibility comprises at least one pest susceptibility index of the crop field. Finally, the process outputs the predicted pest susceptibility at step 132.

Figure 2:
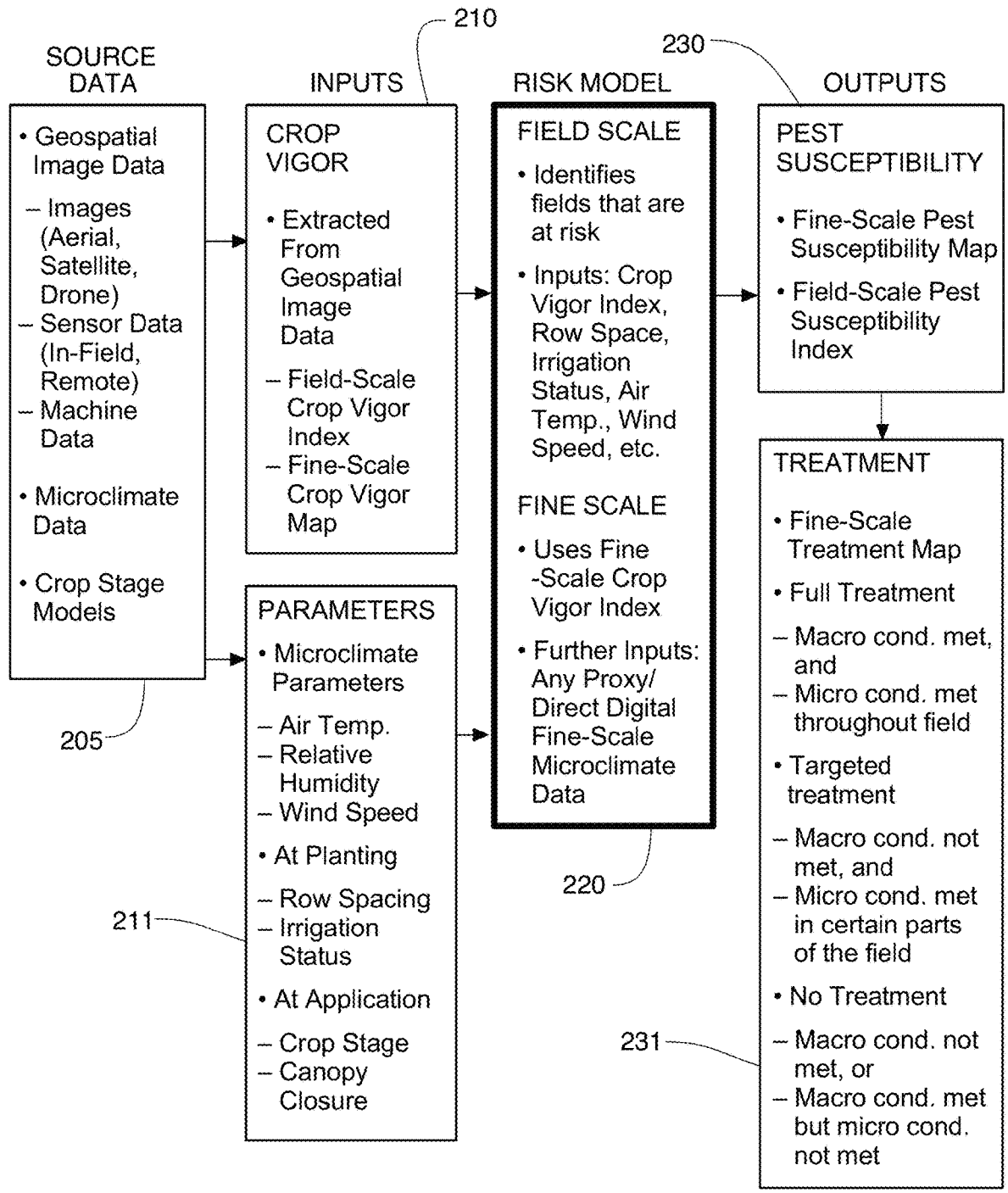
FIG. 2 shows an illustrative block diagram of a process to predict a pest susceptibility of a crop field, in accordance with yet another embodiment of the present invention.

In some embodiments, the process generates a treatment plan (not shown in FIGS. 1A and 1B) based on the pest susceptibility map, as shown in FIG. 2. The treatment plan comprises a recommended agricultural management technique (e.g., application of one or more agricultural chemicals) to prevent the outbreak or control the propagation of one or more crop pests.

In some embodiments, the process further receives price information for a crop growing in the crop field, cost information for one or more agricultural management techniques, and an anticipated efficacy for the agricultural management techniques. The process then generates an anticipated return on investment (ROI) based on the price and cost information and the anticipated efficacy, as discussed below.

Risk Model Inputs and Outputs

The risk model (108, 130) in one embodiment has two inputs: a crop vigor map (102, 116) having at least one crop vigor index, and microclimate parameters (124) extracted from microclimate data (104, 122). Multiple ways of calculating a crop vigor index exist. Generally, the present invention relies on calculations from drone, aerial, satellite, and/or machine-mounted sensors to determine crop vigor. The sensors used are similar to those used in aerial imagery, operating in thermal, multi-spectral, infrared, or visible bands, where sensor data is assigned coordinates (e.g., geocoded). Ground or in-field sensors may also be used. Ground sensors are mounted above the canopy, sometimes on the side of the crop fields (e.g., vineyards), typically mounted on bars or booms directed down on the canopy. Some ground sensors may be densely distributed over the field (e.g., 4-5 feet away from each other).

Band ratios and equations are typically used to quantify crop vigor indices and vegetation indices. For example, the normalized difference vegetation index (NDVI), a vegetation index equation, may be used. The NDVI index is based on the premise that healthy plants exhibit high reflectance to near infrared (NIR) bands and low reflectance to red (RED) bands. Consequently, a low NDVI indicates a stressed crop whereas a high NDVI indicates a vigorous crop. Another equation is the normalized difference red edge (NDRE) index, an index similar to the NDVI but using the red edge (RE) part of the spectrum. Next-generation canopy vigor indices use novel bands/equations (e.g., modified chlorophyll absorption ratio index 2 (MCARI2)). Some embodiments of the current invention use deep learning techniques to produce improved accuracy.

The second input to the risk model (108, 130) is microclimate data (104, 122). The local microclimate in individual fields varies widely depending on the climate and on crop conditions (e.g., canopy density). Areas with thick, dense, or tall canopy are cooler during the day, warmer at night, experience less sunlight, are more likely to be humid or wet, and receive less exposure to wind. Likewise, areas with light, open, or short canopy tend to be warmer during the day, cooler at night, experience more exposure from sunlight, are less likely to be humid or wet, and are significantly more likely to be windy. All of these microclimate characteristics have a direct influence on the likelihood of pest outbreak. Microclimate data (e.g., air temperature, relative humidity, wind speed, radiation, solar insolation, and/or sun exposure) may be obtained through sensor measurements or microclimate models. In one aspect of the present invention, the microclimate parameters used in the risk model are measured using sensors placed in or near the field(s) in question. In another aspect, the microclimate parameters are estimated using models or "synthetic sensors." "Synthetic sensors" are estimates of specific parameters at particular locations based upon interpolated points within a broader microclimate or weather model. Microclimate parameters may also be obtained from third parties, such as third-party ground-based or remote weather stations. In yet other embodiments, microclimate parameters are measured remotely (e.g., aerially).

In one embodiment, the risk model (108, 130) may use a machine learning module, as described below. For example, the machine learning module may use an ensemble of random forest regressors, where the predictor variables are the crop vigor map (102, 116) and other remotely sensed or estimated crop field parameters (120, 128), in conjunction with macroclimate data 122. The dependent variable may be the pest of interest (e.g., white mold severity in soybeans). Model training is performed, where ground truth data comprising the coordinates and corresponding disease severity from a field at the end of the season may be used for modeling with in-season crop vigor indices, or other remotely sensed crop field parameters and macroclimate conditions at the time of imagery collection. This process quantifies the relationship between pest severity and in-season variables of crop vigor or other remotely sensed crop parameters and macroclimate conditions. This procedure should be repeated for the pest and crop of interest, as different relationships are expected, resulting in unique crop- and pest-dependent models. It is important to note that training with data from coordinates with all pest outbreak levels (e.g., no disease, light disease, moderate disease, and severe disease) is preferred. Further detailed discussion of the risk model is given below (e.g., see FIGS. 2, 3, 8).

FIG. 2 outlines one embodiment of a process according to the present disclosure, which illustrates a process to predict a pest susceptibility of a crop field. Several inputs and input parameters 210 are automatically determined from source data 205. The source data 205 comprises microclimate data and geospatial image data, such as aerial, satellite, and drone images, as well as sensor and machine data collected remotely or on the crop field. In addition, source data may also include crop stage models. The process generates a set of inputs relative to crop vigor 210 and a set of input parameters 211 from the source data 205. The crop vigor inputs 210 are extracted from the geospatial image data and include a crop vigor index applying to the whole crop field (i.e., field-scale crop vigor index) or a set of geolocated crop vigor indices forming a fine-scale crop vigor map for the crop field. The input parameters 211 comprise microclimate data (e.g., air temperature, relative humidity, wind speed, solar insolation and/or sun exposure) relative to the crop field. The input parameters 211 may also comprise agronomic data (e.g., row spacing, irrigation status, crop stage, and canopy closure) at various times (e.g., planting, treatment application) as well. A risk model 220 is used to predict the susceptibility of an outbreak of one or more crop pests (e.g., white mold in soybeans) based upon the crop vigor 210 and input parameters 211. An output 230 of the process is a measure of pest susceptibility at a fine scale (i.e., pest susceptibility map) or at a field scale (e.g., pest susceptibility index). A treatment plan 231 for the crop field may also be generated from the generated pest susceptibility, where the treatment plan comprises the implementation of agricultural management techniques (e.g., applications of specific chemicals such as fungicides) to prevent the outbreak, or control the propagation, of crop pest(s). In one embodiment, an output treatment plan 231 may depend on whether the field-scale (i.e., macro) and/or the fine-scale (i.e., micro) conditions for a pest outbreak are met, leading to (a) full treatment of the crop field if macro conditions are met and micro conditions are met throughout the field; (b) targeted treatment of certain portions of the crop field if macro conditions are not met and micro conditions are met for those portions, or (c) no treatment if macro conditions are not met or micro conditions are not met throughout the crop field. The process of FIG. 2 therefore converts the crop vigor index map and other input parameters (210, 211) into a prescription for an appropriate agricultural management procedure, such as spraying pesticide (e.g., herbicide, insecticide, fungicide, insect repellent, animal repellent) in parts of the field that are most likely to experience pest outbreaks. Agricultural management procedures also include applying fertilizer and plant nutrients. The output pest susceptibility values 230 can be broken down into zones for targeting different treatments (e.g., spray rates) based on the product being applied, the equipment available for application, and the risk a grower/agronomist is willing to take.

In one embodiment, the source data 205 is remote sensed and/or modeled to deduce the agronomic and microclimate parameters 211, and thus make it possible to predict from remote data alone the likely risk of a pest (e.g., white mold in soybeans) outbreak in a particular crop field or portion of a particular crop field. Therefore, a major advantage of the embodiments described herein is that it is not necessary to measure all input environmental variables on the ground in order to provide value to the grower or retailer. Furthermore, owing to the embodiments described herein, it is not necessary to measure pest severity in all fields, as results from detailed measurements from sample fields can transferred to fields with similar crops and environmental parameters.

The present invention addresses some of the limitations of the prior art by providing a pathway to use machine data, remote sensing data, and/or machine learning to determine which fields, or portions thereof, exhibit conditions amenable to pest outbreak or propagation. In another aspect, the present invention provides advantages over prior art methods in that no on-the-ground presence is required. In one embodiment, all input data may be collected via machine data, remote sensing, or crop modeling. In another embodiment, the input data may be analyzed, assessed, and compared to actual outbreaks of disease via machine learning and/or other artificial intelligence techniques to predict which fields, or portions thereof, are most likely to experience a disease outbreak or propagation. In yet another embodiment, particular agricultural management techniques (e.g., specific fungicides) may be analyzed, assessed, and/or compared to other treatment options (e.g., other fungicides) or controls (e.g., non-treatment) to determine the efficacy particular treatment options have in terms of improved crop vigor, yield, or other indicia of effectiveness. In one aspect of this embodiment, treatment efficacy may be determined using machine data or remote sensing.

Artificial Intelligence Input Modules and Further Outputs

Figure 3:
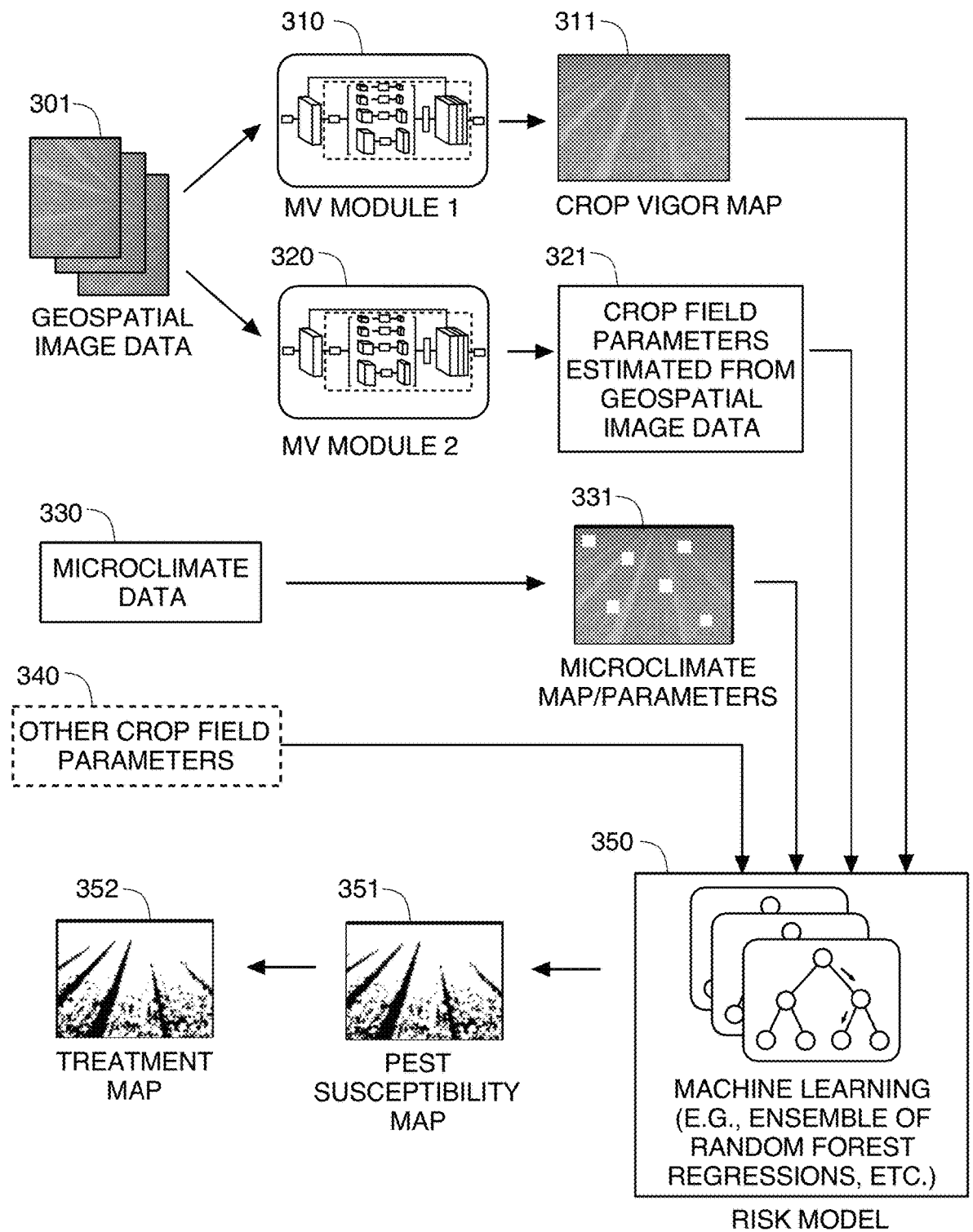
FIG. 3 shows an illustrative flowchart for a process for the generation of a treatment map for a crop field, in accordance with yet another embodiment of the present invention.

FIG. 3 illustrates a process for the generation of a treatment map 352 for a crop field, in accordance with another embodiment of the present invention. The process of FIG. 3 receives two inputs: (a) geospatial image data 301 (e.g., aerial images of the crop field), and (b) microclimate data 330 pertaining to the crop field. The process feeds the received geospatial image data 301 to two machine vision modules executable by a hardware processor: a first machine vision module (MV Module 1) 310 to generate a crop vigor map 311, and a second machine vision module (MV Module 2) 320 to estimate crop field parameters 321 (e.g., canopy closure). The machine vision algorithms used in some embodiments to determine the crop vigor map and the crop field parameters are described in further detail in FIG. 7.

The process also extracts microclimate parameters or a microclimate map 331 from the received microclimate data 330, where the microclimate map comprises at least one microclimate parameter mapped to a geolocation of the crop field. In FIG. 3, the microclimate parameters 331 are represented as square dots on the crop field image.

In addition, the process has an optional third input comprising crop field parameters 340 other than the parameters 321 estimated by the second machine vision module. In one embodiment, the other crop field parameters 340 are machine data received from agricultural equipment or other equipment. The crop field parameters estimated by the second machine vision algorithm 320 or received in the step 340 may include the crop row spacing at one or more geolocations of the crop field, the irrigation status, the degree of canopy closure, or the crop stage, each estimated or received for one or more geolocations of the crop field. In one embodiment, the irrigation status may be estimated using geospatial image data and/or received from machine data from one or more irrigation equipment. In one embodiment, the degree of canopy closure may be estimated from the geospatial image data using the same machine vision algorithm used in step 114. In one embodiment, the crop stage may be determined from physical observation and/or one or more crop models.

At step 350, the process applies a risk model to predict pest susceptibility based on the determined crop vigor map 311, the estimated crop field parameters 321, the microclimate parameters 331, and the other (received) crop field parameters 340, where the predicted pest susceptibility comprises at least one pest susceptibility index of the crop field. Finally, the process outputs the predicted pest susceptibility at step 351.

In some embodiments, the process generates a treatment plan (not shown in FIGS. 1A and 1B) based on the generated pest susceptibility map, as shown in FIG. 3. The generated treatment plan comprises a recommended agricultural management technique (e.g., application of one or more agricultural chemicals) to prevent the outbreak or control the propagation of one or more crop pests.

In some embodiments, the process further receives price information for a crop growing in the crop field, cost information for one or more agricultural management techniques, and an anticipated efficacy for the agricultural management techniques. The process then generates an anticipated return on investment (ROI) based on the price and cost information and the anticipated efficacy, as discussed below.

Figure 4:
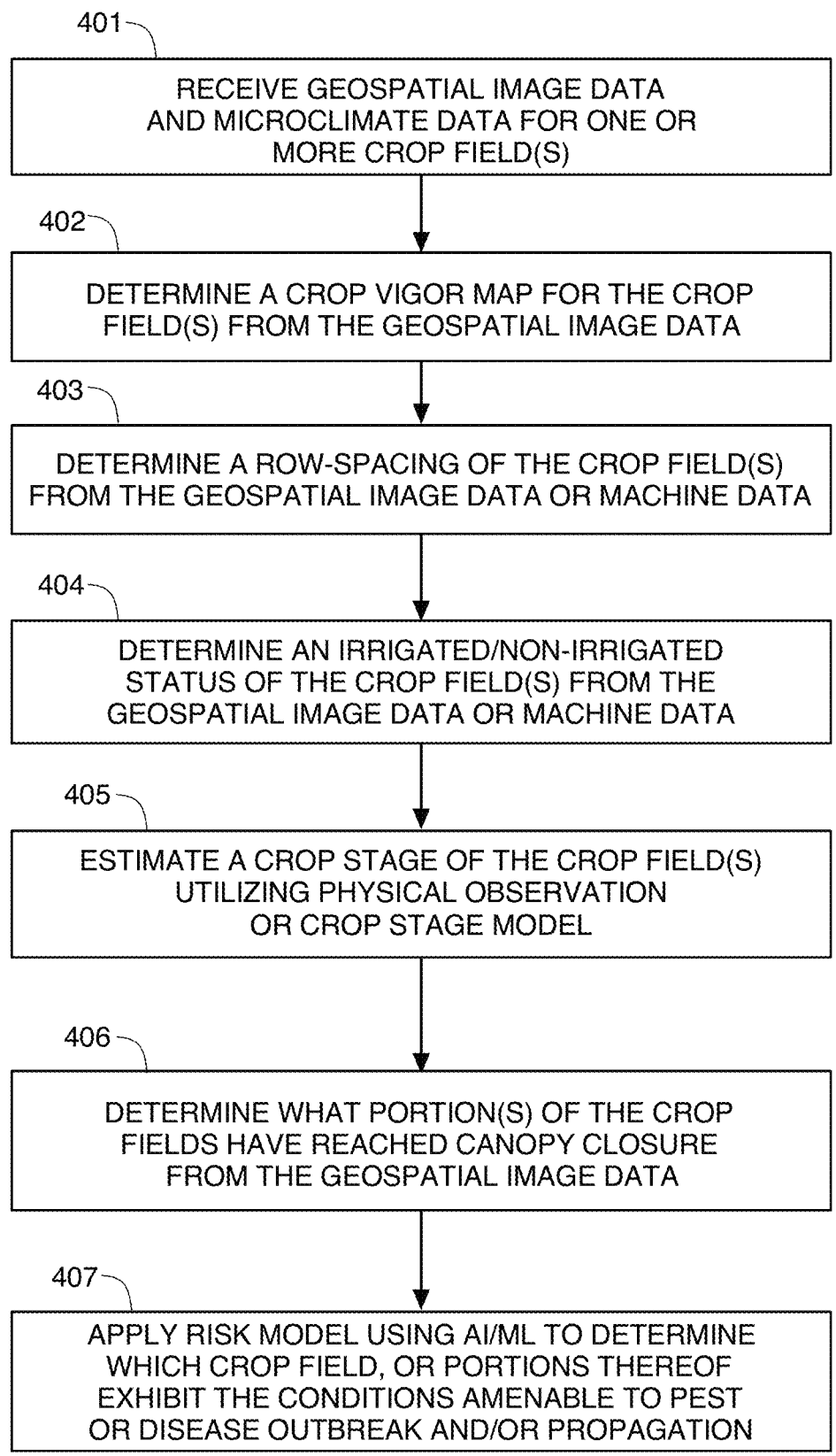
FIG. 4 shows an illustrative flowchart of a process to determine which fields, or portions thereof, exhibit conditions amenable to pest or disease outbreak and/or propagation, in accordance with yet another embodiment of the present invention.

FIG. 4 shows another illustrative flowchart of a process for pest susceptibility determination, in accordance with yet another embodiment of the present invention. The process begins at step 401, where the process receives geospatial image data and microclimate data for one or more crop fields. At step 402, the process determines, utilizing a hardware processor, a crop vigor map for the crop fields from the geospatial image data. At step 403, the process determines, utilizing the hardware processor, a row-spacing of a crop fields from the geospatial image data or from machine data. At step 404, the process determines, utilizing the hardware processor, an irrigation status of the crop fields from the geospatial image data or from machine data. At step 405, the process estimates, utilizing the hardware processor, a crop stage of the crop fields based upon physical observation and/or a crop stage model. At step 406, the process determines, utilizing the hardware processor, whether the crop fields, and what portions of the crop fields, have reached canopy closure from the geospatial image data. At step 407, the process applies, utilizing the hardware processor, a risk model to determine what portions of the crop fields are amenable to pest or disease outbreak and/or propagation, and thus warrant either full or partial treatment. In some embodiments, the risk model utilizes one or more of the determined row-spacing, the irrigation status, the crop stage, and the portion(s) of canopy closure as inputs. In some embodiments, the system further takes into account how the fields, or portions thereof, are located spatially and/or topographically, to provide an optimal or near-optimal treatment plan to prevent the outbreak, or control the propagation, of a crop pest.

Automatically Collecting Crop Field Parameters

In some embodiments, agronomic input data (row spacing, irrigated/non-irrigated determination, crop stage determination, canopy closure determination) may be determined automatically as illustrated in FIGS. 3 and 4 or calculated as follows. In one embodiment, row spacing is determining from either machine data (e.g., from the tractor or planter records) or from remote geospatial image data (e.g., aerial, satellite, drone, or in-field sensing data and/or imagery). The tractor or planter records may be obtained via a network, in cases where such data is available. Such data may also be downloaded by hard wire connection from the tractor or planter. Machine data may be obtained from third parties, such as agricultural equipment dealers, agricultural retailers or consultants, or the growers themselves. In cases where machine data is not available or not easily accessed, geospatial image data and analytics may be used to estimate row spacing, as described below.

In one embodiment, a determination may be made whether the crop field is irrigated or non-irrigated from either machine data or geospatial image data. In one embodiment, geospatial image data is utilized to determine field shape or other indicators of irrigation, including either thermal or other imagery which may detect irrigation application. Wavelengths capable of detecting whether a field is irrigated include long-wavelength infrared (8,000-15,000 nanometers (nm), 20-37 THz), short-wavelength infrared (1,400-3,000 nm, 100-214 THz), and C-Band radio frequencies (4-8 GHz, as used in Synthetic Aperture Radar).

In some embodiments, an estimation may be made of crop stage through the use of physical observation of the field in question or one or more crop stage models. In one embodiment, the crop stage models may estimate crop stage using a combination of data sources including (but not limited to), a measure or estimate of planting or emergence date, a measure or estimate of "thermal time" (i.e., accumulated number hours above a temperature threshold), a measure or estimate of "photoperiod" (i.e., the length of daylight) at critical intervals, etc.

In one embodiment, the Iowa State Soybean Development Calculator, available at http://agron.iastate.edu/CroppingSystemsTools/soybean-decisions.html (retrieved in May 2020) and hereby incorporated by reference herein as if fully set forth herein, may be utilized.

In some embodiments, geospatial image data and machine vision algorithms may be used to determine quantitatively a degree of canopy closure of the crop field. Canopy closure may create in-field conditions needed for the outbreak or propagation of a pest in the particular field at a time that other conditions in a general region of the field are suitable to the pest. If the entire field has not reached the requisite in-field conditions (e.g., reproductive stage and near-full canopy closure) at the relevant time, identifying those areas of the field that have reached the requisite conditions conducive to pest outbreak and propagation may allow for targeted implementation of agricultural management techniques (e.g., applications of specific chemicals such as fungicides) to prevent the outbreak, or control the propagation, of crop pest(s).

In some embodiments, the potential for pest outbreak or propagation is estimated in particular fields or portions thereof based upon specific data parameters, including (but not limited to), the crop row spacing, the irrigation status, the degree of canopy closure, and/or the crop stage.

Geospatial Image Data and Analytics to Determine Crop Field Parameters

In one embodiment, geospatial image data and machine vision algorithms may be used to determine crop field parameters. For example, machine vision algorithms may be used to measure row spacing and determine quantitatively the degree of canopy closure of the crop field. In one embodiment, the geospatial image data collection is performed aerially using an aircraft. The same aircraft may also be used to determine both row spacing and canopy closure. In another embodiment, the geospatial image data collection is performed via satellite. In yet another embodiment, the geospatial image data collection is performed using a drone. In some embodiments, imagery data (satellite, aerial, and/or drone) may also be obtained from third parties, such as imagery vendors serving the agricultural sector.

In some embodiments, in order to measure the distance between the rows to determine row spacing as well as canopy closure, imagery (either satellite, aerial, or drone) must be geo-referenced or geo-rectified and may need to be ortho-mosaiced.

Using remote geospatial image data and computer vision algorithms allows measurement and quantification of crop field parameters, such as row spacing and canopy closure, across the entire field, and thus provides a more accurate measure across an entire field or specific portions of the field. One benefit of the present invention is measuring quantitatively the crop field parameters across the whole field and providing pest susceptibility or treatment maps, all being performed remotely, automatically, and accurately.

In some embodiments, the measurement of crop field parameters utilizes one or more machine vision algorithms. Various machine vision algorithms are within the scope of the present invention. Illustrative machine vision algorithms utilizing a convolutional neural network (CNN) architecture are described below in reference to FIG. 7 below.

Risk Model Embodiments

In one embodiment, a risk model (108, 130, 220, 350) is utilized to determine which fields, or portions thereof, exhibit conditions amenable to pest outbreak or propagation. Various models are within the scope of the present invention.

Existing risk models have been shown to have high accuracy. However, none are known to reach 100% accuracy (i.e., correct pest predictions). For example, 82% to 91% accuracy is observed in R1 to R3 soybean stage for the weather-based model described in the following publication, which is incorporated by reference as if fully set forth herein: *Weather-Based Models for Assessing the Risk of Sclerotinia sclerotiorum Apothecial Presence in Soybean (Glycine max) Fields*, November 2017, available at https://apsjournals.apsnet.org/doi/10.1094/PDIS-04-17-0504-RE. Similarly, 65.2% to 78.8% accuracy is observed for the apothecial model described in the following publication, which is incorporated by reference as if fully set forth herein: *Validating Sclerotinia sclerotiorum Apothecial Models to Predict Sclerotinia Stem Rot in Soybean (Glycine max) Fields*, October 2018, available https://apsjournals.apsnet.org/doi/10.1094/PDIS-020245-RE, depending on which disease incidence thresholds were used. In one embodiment, a risk model may combine existing weather-based models and crop-parameter-based models to map the risk of a white mold outbreak at different locations of a soybean crop field with high accuracy.

As mentioned above, the risk model may utilize a machine learning (ML) algorithm, such as a random forest, in some embodiments. Various machine learning algorithms are within the scope of the present invention, and illustrative machine learning algorithms for implementing the risk model are described below. Illustrative machine learning algorithms utilizing a random forest architecture are described in reference to FIG. 8 below.

In one embodiment, an output (231, 407) of the risk model is a determination of what portion(s) of the crop field in which to implement agricultural management techniques (e.g., applications of specific chemicals such as fungicides) to prevent the outbreak, or control the propagation, of crop pests(s). The output may take the form of a treatment map (231, 352). In instances where the entire field may not be susceptible to an outbreak (e.g., because the entire field is not at canopy closure in the case of white mold), the present invention may develop sub-field scale maps to identify areas of the field susceptible to pest outbreak and/or propagation. This type of output is further illustrated in FIGS. 13A and 13B.

In one embodiment, the risk model also receives pricing and cost information on the costs and efficacy of applying one or more agricultural management technique(s) in order to facilitate cost-benefit analysis on the techniques. The pricing and cost information may be received from one or more third-party data sources or may be modeled using one or more correlation or regression models.

In one embodiment, once a given crop field is identified as a likely candidate for a pest outbreak, the system may compare a likely efficacy of various treatment options based upon published data, data from machines, data from manufacturers or retailers of treatment techniques, agricultural consultants, growers, third party vendors, or CERES internal data. In one embodiment, the efficacy determinations are performed through one or more machine learning (ML) algorithms, such as a random forest algorithm, described in relation to FIG. 8. In one embodiment, the ML algorithm predicts which treatment is likely to be most effective given various parameters, including the microclimate data, soil data, the crop stage, crop variety, and so forth. As a result, the likely benefits of various treatment options are then predicted by the ML algorithm in a quantitative manner (e.g., in terms of expected increases in crop yield). The yield benefits are then converted into economic estimates by, in one illustrative aspect, multiplying the yield benefits by the price of the particular crop in question. The economic benefits are then compared to the cost of the treatment option(s) to predict a likely return on investment (ROI) of various treatment options.

Accordingly, and in accordance to one embodiment, the risk model implementation further comprises program code to receive price information for a crop growing in the crop field, a cost information for one or more agricultural management techniques, and an anticipated efficacy for the agricultural management techniques, and generate an anticipated return on investment (ROI) based on the price and cost information and the anticipated efficacy.

Implementation Using Computer Program Products, Methods, and Computing Entities

The present invention may be implemented in a combination of hardware and/or software. An illustrative hardware and software operational environment for implementing one embodiment of the present invention is now described.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive *random*-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

An exemplary embodiment of the present disclosure may include one or more servers (management computing entities), one or more networks, and one or more clients (user computing entities). Each of these components, entities, devices, systems, and similar words used herein interchangeably may be in direct or indirect communication with, for example, one another over the same or different wired or wireless networks. Additionally, while FIGS. 5-6 illustrate the various system entities as separate, standalone entities, the various embodiments are not limited to this particular architecture.

Exemplary Management Computing Entity

Figure 5:
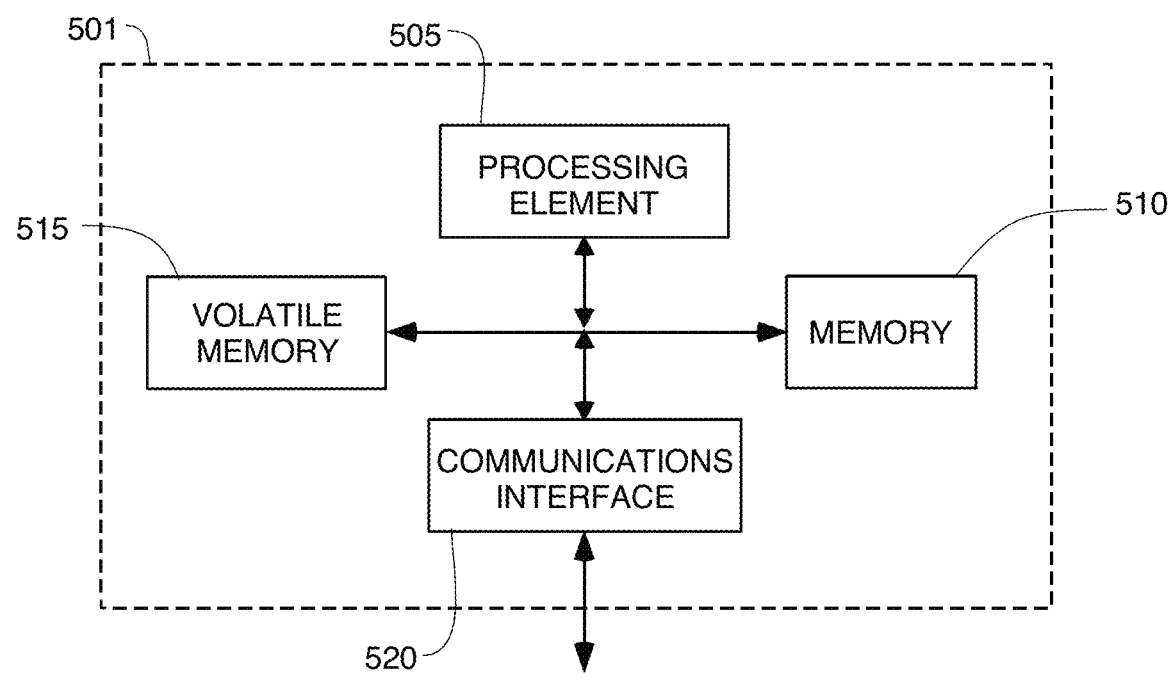
FIG. 5 is an exemplary schematic diagram of a server (management computing entity) for implementing the present invention, in accordance with example embodiments of the disclosure.
Figure 6:
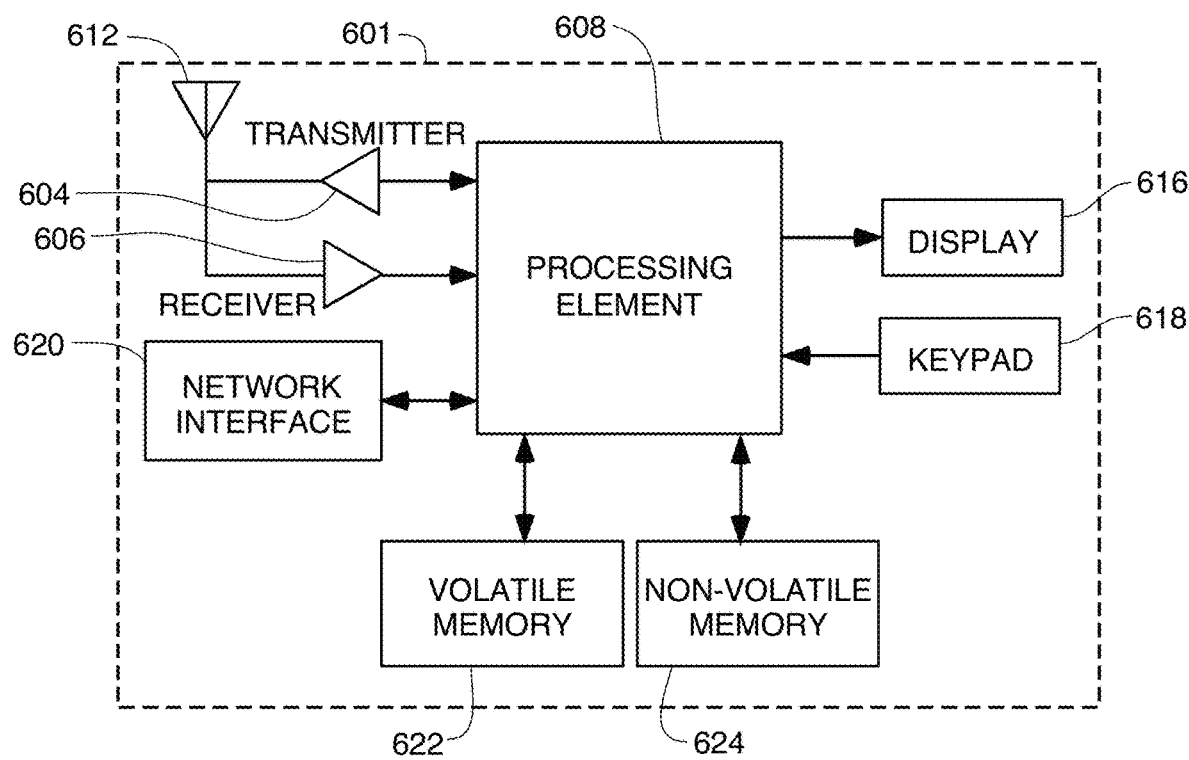
FIG. 6 is an exemplary schematic diagram of a client (user computing entity) for implementing the present invention, in accordance with example embodiments of the disclosure.

FIG. 5 provides a schematic of a server (management computing entity) 501 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 501 may also include one or more communications interfaces 520 for communicating with various computing entities, such as by communicating data, content, information, and/or similar terms used herein interchangeably that can be transmitted, received, operated on, processed, displayed, stored, and/or the like. For instance, the management computing entity 501 may communicate with user computing entities 601 and/or a variety of other computing entities providing geospatial image data 301, microclimate data 330, or other crop field parameters 340.

As shown in FIG. 5, in one embodiment, the management computing entity 501 may include or be in communication with one or more processing elements 505 (also referred to as processors, processing circuitry, and/or similar terms used herein interchangeably) that communicate with other elements within the management computing entity 501 via a bus, for example. As will be understood, the processing element 505 may be embodied in a number of different ways. For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present disclosure when configured accordingly.

In one embodiment, the management computing entity 501 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 510, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 501 may further include or be in communication with volatile media (also referred to as volatile storage, memory, memory storage, memory circuitry and/or similar terms used herein interchangeably). In one embodiment, the volatile storage or memory may also include one or more volatile storage or memory media 515, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 501 with the assistance of the processing element 505 and operating system.

As indicated, in one embodiment, the management computing entity 501 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 501 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 501 may include or be in communication with one or more input elements, such as a keyboard input, a mouse input, a touch screen/display input, motion input, movement input, audio input, pointing device input, joystick input, keypad input, and/or the like. The management computing entity 501 may also include or be in communication with one or more output elements (not shown), such as audio output, video output, screen/display output, motion output, movement output, and/or the like.

As will be appreciated, one or more of the components of the management computing entity 501 may be located remotely from other management computing entity 501 components, such as in a distributed system. Furthermore, one or more of the components may be combined and additional components performing functions described herein may be included in the management computing entity 501. Thus, the management computing entity 501 can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 6 provides an illustrative schematic representative of a client (user computing entity) 601 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 601 can be operated by various parties. As shown in FIG. 6, the user computing entity 601 can include an antenna 612, a transmitter 604 (e.g., radio), a receiver 606 (e.g., radio), and a processing element 608 (e.g., CPLDs, microprocessors, multi-core processors, coprocessing entities, ASIPs, microcontrollers, and/or controllers) that provides signals to and receives signals from the transmitter 604 and receiver 606, respectively.

The signals provided to and received from the transmitter 604 and the receiver 606, respectively, may include signalling information in accordance with air interface standards of applicable wireless systems. In this regard, the user computing entity 601 may be capable of operating with one or more air interface standards, communication protocols, modulation types, and access types. More particularly, the user computing entity 601 may operate in accordance with any of a number of wireless communication standards and protocols, such as those described above with regard to the management computing entity 501. In a particular embodiment, the user computing entity 601 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 601 may operate in accordance with multiple wired communication standards and protocols, such as those described above with regard to the management computing entity 501 via a network interface 620.

Via these communication standards and protocols, the user computing entity 601 can communicate with various other entities using concepts such as Unstructured Supplementary Service Data (USSD), Short Message Service (SMS), Multimedia Messaging Service (MMS), Dual-Tone Multi-Frequency Signalling (DTMF), and/or Subscriber Identity Module Dialer (SIM dialer). The user computing entity 601 can also download changes, add-ons, and updates, for instance, to its firmware, software (e.g., including executable instructions, applications, program modules), and operating system.

According to one embodiment, the user computing entity 601 may include location determining aspects, devices, modules, functionalities, and/or similar words used herein interchangeably. For example, the user computing entity 601 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 601 position in connection with a variety of other systems, including cellular towers, Wi-Fi access points, and/or the like. Similarly, the user computing entity 601 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 601 may also comprise a user interface (that can include a display 616 coupled to a processing element 608) and/or a user input interface (coupled to a processing element 608). For example, the user interface may be a user application, browser, user interface, and/or similar words used herein interchangeably executing on and/or accessible via the user computing entity 601 to interact with and/or cause display of information from the management computing entity 501, as described herein. The user input interface can comprise any of a number of devices or interfaces allowing the user computing entity 601 to receive data, such as a keypad 618 (hard or soft), a touch display, voice/speech or motion interfaces, or other input device. In embodiments including a keypad 618, the keypad 618 can include (or cause display of) the conventional numeric (0-9) and related keys (#, *), and other keys used for operating the user computing entity 601 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 601 can also include volatile storage or memory 622 and/or non-volatile storage or memory 624, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 601. As indicated, this may include a user application that is resident on the entity or accessible through a browser or other user interface for communicating with the management computing entity 501 and/or various other computing entities.

In another embodiment, the user computing entity 601 may include one or more components or functionality that are the same or similar to those of the management computing entity 501, as described in greater detail above. As will be recognized, these architectures and descriptions are provided for exemplary purposes only and are not limiting to the various embodiments.

Machine Vision and Machine Learning Modules

The present invention may be implemented using one or more machine vision and machine learning modules implementing one or more algorithms implemented in non-transitory storage medium having program code stored thereon, the program code executable by one or more processors, as described above. The following description describes in detail some of the illustrative machine vision and machine learning algorithms useful for implementing some embodiments of the present invention.

Illustrative Machine Vision Architectures

Various exemplary machine vision algorithms are within the scope of the present invention used for generating a crop vigor map 311 and for estimating crop parameters 321 such as crop row spacing, canopy closure, and so forth, from geospatial image data 301.

Some exemplary machine vision algorithms utilize a deep learning network (DLN), for example using a convolutional neural network (CNN). FIG. 7 shows an exemplary CNN module that may be utilized for implementing various machine vision algorithms described herein. In FIG. 7, one or more input layers 702 are connected via a multiplicity of hidden layers 704 to one or more output layers 706. This neural network architecture may receive geospatial image data 701 and may be trained to generate 708 a crop vigor map, a crop vigor index, or to estimate 708 row spacing, canopy closure, and other machine vision tasks required by the present invention. FIG. 7 shows only one illustrative CNN architecture that is within the scope of the present invention, and the present invention is not limited to the use of CNNs. Other machine vision algorithms are also within the scope of the present invention.

Illustrative Machine Learning Architectures

Various exemplary machine learning algorithms may be used within the scope of the present invention as a risk model 350 to determine pest susceptibility 351 from a crop vigor map 311, microclimate data 330, and other estimated 321 or received 340 crop field parameters.

FIG. 8 shows an illustrative diagram for a machine learning algorithm used to implement the risk model 350, in accordance with one embodiment of the invention. In one embodiment, the machine learning algorithm comprises a random forest algorithm, one illustrative machine learning algorithm. Random forest algorithms use a multitude of decision tree predictors, such that each decision tree depends on the values of a random subset of the training data, which minimizes the chances of overfitting to the training data set. In one embodiment, the random forest algorithm is implementation as described in Leo Breiman, *Random Forests*, Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention. The input to the machine learning algorithm is a feature vector 802, comprising the input data described above (i.e., crop vigor index, microclimate data, etc.). The output of the machine learning algorithm are the predicted pest susceptibility indices 808 for the different portions of the crop field.

As noted, embodiments of devices and systems (and their various components) described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events.

Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z_1, z_2, z_n)$, to a confidence that the input belongs to a class, as by $f(z)=confidence(class)$. Such classification may employ a probabilistic and/or statistical-based analysis (e.g., factoring into the analysis utilities and costs) to determinate an action to be automatically performed. Another example of a classifier that can be employed is a support vector machine (SVM). The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches can be employed, including, e.g., naive Bayes, Bayesian networks, decision trees, neural networks, fuzzy logic models, and/or probabilistic classification models providing different patterns of independence. Classification as used herein also is inclusive of statistical regression that is utilized to develop models of priority.

Training the Machine Learning Algorithms

Figure 9:
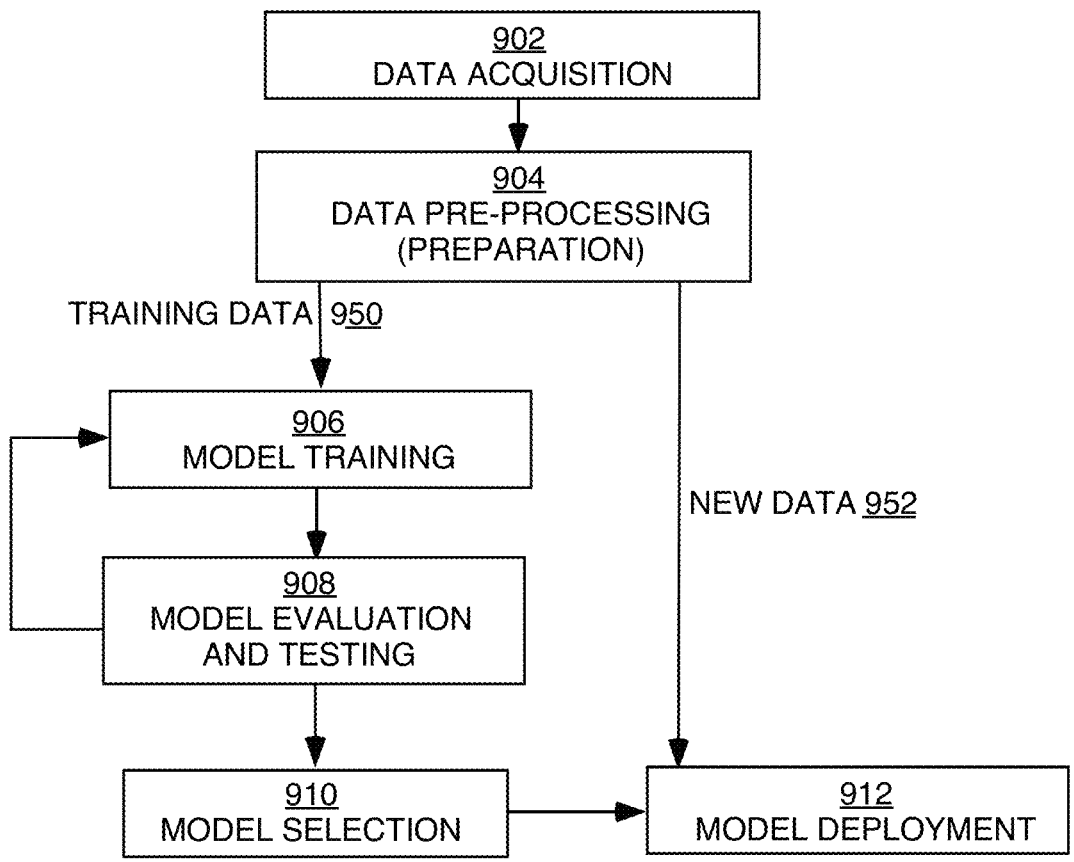
FIG. 9 shows an example flow diagram for training the machine learning algorithm, in accordance with example embodiments of the disclosure.

FIG. 9 shows a diagram of an exemplary flow diagram for training the machine learning (ML) algorithms (e.g., the risk model 350), which are utilized in predicting which fields, or portions thereof, exhibit conditions amenable to pest outbreak or propagation, in accordance with example embodiments of the present invention. The training process begins at step 902, with data acquisition. At step 904, the acquired data is pre-processed (known as data preparation). At step 906, the model is trained using training data 950. At step 908, the model is evaluated and tested, and further refinements to the model are fed back into step 906. At step 910, the optimal model parameters are selected. At step 912, the model is deployed. New data 952 can now be used by the deployed model to make predictions.

In various embodiments of the present invention, training may apply to the machine vision algorithms described in FIG. 7 or to the machine learning algorithms described in FIG. 8. For the machine vision algorithms described above (e.g., 310, 320), the input data acquired at step 902 may comprise geospatial image data of one or more sample crop fields and one or more crop vigor maps for the one or more sample crop fields. For the machine learning algorithms described above (e.g., the risk model 350), the input data acquired at step 902 may comprise crop vigor map of one or more sample crop fields as well as microclimate data, other crop field parameters (e.g., row spacing), pest outbreak measurements, and/or agricultural treatment plans of the one or more sample crop fields.

A starting point for any machine learning method such as used by the machine learning component above is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system depends on (a) the pattern parameterization, (b) the learning machine design, and (c) the quality of the training database. These components can be refined and optimized using various methods. For example, the database can be refined by adding datasets for new documented crop fields. The quality of the database can be improved, for example, by populating the database with cases in which the customization was accomplished by one or more experts in crop pest prediction or treatment (e.g., fungicide) application. Thus, the database will better represent the expert's knowledge. In one embodiment, the database includes data, for example, of poor agricultural management, which can assist in the evaluation of a trained system.

CERES Platform

Figure 10:
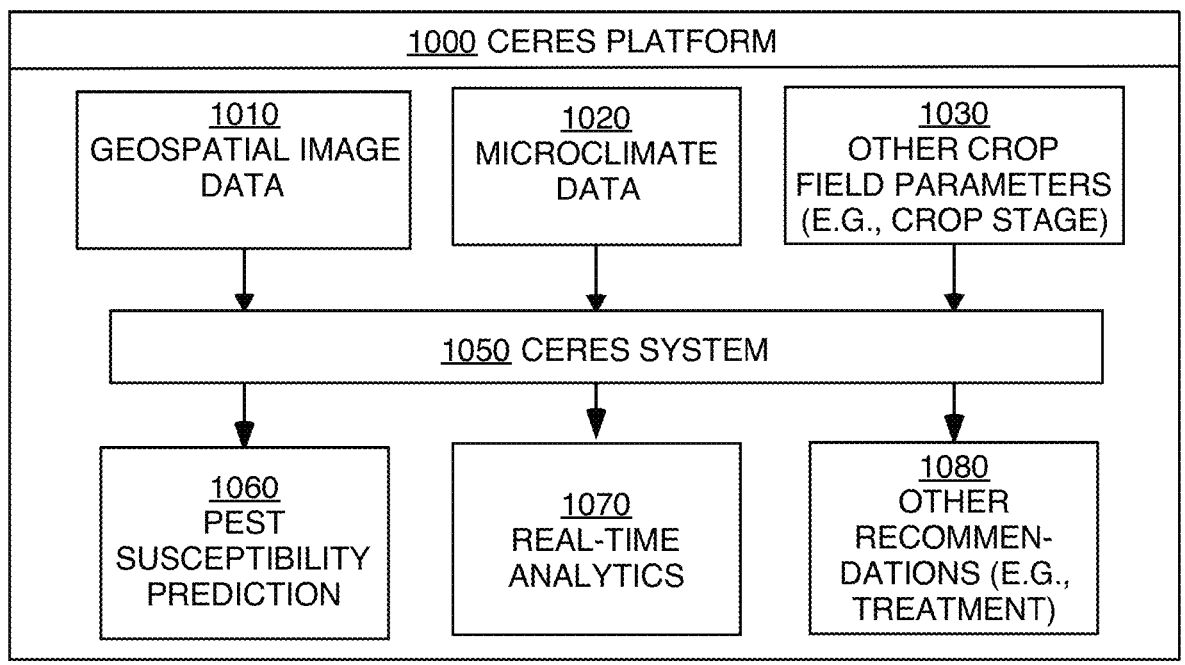
FIG. 10 shows an illustrative block diagram showing functionalities provided by an extended CERES platform, according to one embodiment of the present invention.

FIG. 10 is a schematic diagram illustrating functionalities provided by an extended CERES platform 1000, according to one embodiment of the present invention. In some embodiments, the CERES platform 1000 may receive geospatial image data (e.g., remote aerial images) 1010, microclimate data 1020, and other crop field parameters (e.g., crop stage, row spacing, etc.) 1030. The received data may be processed by the CERES system 1050, and stored in the cloud for later use, analysis, playback, and predictions.

The CERES server 1050 may provide crop pest susceptibility predictions 1060, real-time analytics 1070, and/or other agricultural management recommendations (e.g., crop field treatment) 1080 to a plurality of end-user devices over the network.

Although the CERES system 1050 as shown in FIG. 10 serves as the core for CERES platform 1000, in some embodiments, CERES platform 1000 may be networked among multiple user devices, where a CERES system 1050 may be connected to multiple user computing devices, each used to analyze input data and display treatment (e.g., fungicide) application data, and for providing analytics. Such analytics data may be stored at the CERES system 1050, which in turn may facilitate sharing of such data among individual users, or participants of an online agronomic analytics community.

Example Use Cases and Proof-of-Concept of the Present Invention

Figure 11:
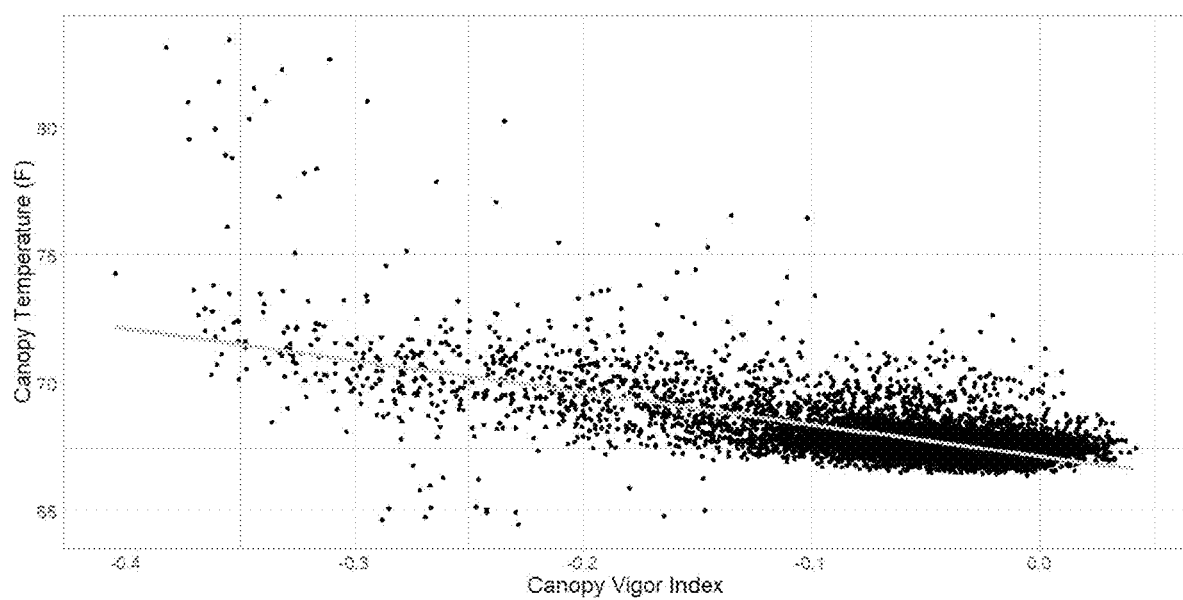
FIG. 11 shows an exemplary regression relationship between canopy temperature and crop vigor index data points, according to one embodiment of the present invention.

FIG. 11 shows an exemplary relationship between canopy temperature and crop vigor index. The measurements are derived from CERES IMAGING sensors for a specific crop field and show a plotted regression line illustrating the linear relationship between the two quantities. The variable on the x-axis is a crop vigor index similar to NDVI or NDRE, and the y-axis is temperature in degrees Fahrenheit.

The plot of FIG. 11 highlights how diurnal canopy temperatures (solar noon) are generally warmer where the canopy is open/weak. Most of the ~10,000 points from this soybean field are clustered at a relatively dense canopy with indices ranging from −0.1 to 0.0. FIG. 11 shows that this dense canopy is cooler during the day (i.e., less than 70 degrees Fahrenheit). These parts of the field are more susceptible to diseases such as white mold. The strong correlation between the crop vigor index on the x-axis and canopy temperature on the y-axis indicates that canopy temperature derived from aerial or in-field sensors can be used to determine a crop vigor index, as depicted in the processes of FIGS. 1A and 1B. Moreover, this strong relationship also indicates that a crop vigor index could be an excellent proxy for microclimate parameters in microclimates that strongly influence the presence, absence, or severity of pests. This is a useful feature in some embodiments, since acquiring robust and reliable thermal data at the field scale may be expensive. In such microclimates, it is therefore possible to have embodiments that use solely geospatial image data inputs.

In order to develop a spatially explicit output map of fine-scale pest susceptibility 351 that can be used for precise treatment 352, the first machine vision module 310 described in some embodiments above to determine a crop vigor map 311 requires pest susceptibility data as a dependent variable. For purposes of calibration and training, such pest susceptibility data should include GPS coordinates with corresponding presence, absence, and/or severity of the pest, as discussed in FIGS. 12A, 12B, 13A, and 13B.

Figure 12A:
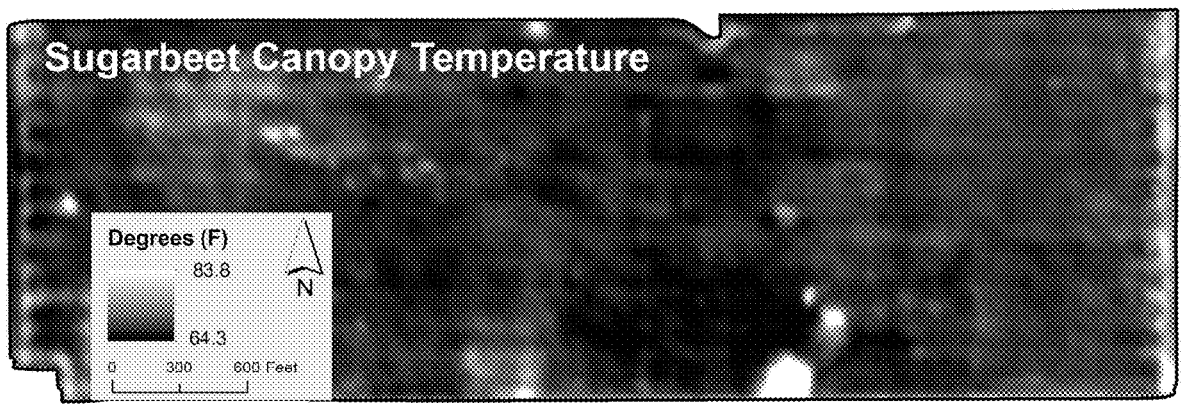
FIG. 12A shows canopy temperatures of an illustrative sugarbeet field, as computed by an aerial thermal camera, according to one embodiment of the present invention.
Figure 12B:
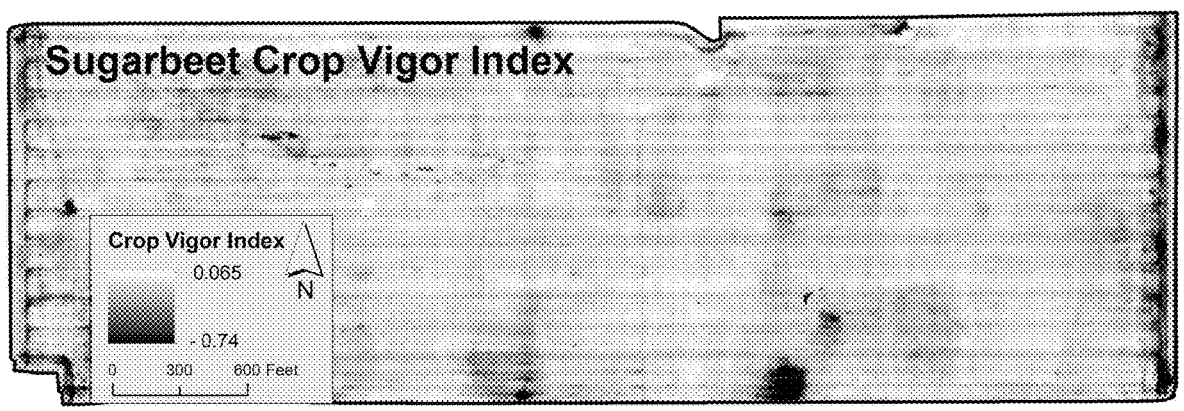
FIG. 12B shows a Chlorophyll vegetation index map (i.e., a crop vigor map) calculated for the same illustrative crop field and on the same flight as FIG. 12A.

FIGS. 12A and 12B demonstrate the viability of the invention through data collected by CERES IMAGING from the field. FIG. 12A shows canopy temperatures of a sugarbeet field computed by an aerial thermal camera, whereas FIG. 12B shows the Chlorophyll vegetation index map (i.e., a crop vigor map) calculated for the same crop field on the same flight. It is clear that the crop vigor map correlates strongly with canopy temperature: the spots with open/weak canopy on the Chlorophyll vegetation index map of FIG. 12B (darker spots) correspond to warmer areas on the canopy temperature map of FIG. 12A (lighter spots). Similarly, the spots with thick/dense canopy on the crop vigor map correspond to cooler areas on the canopy temperature map.

In some embodiments of the present invention, the risk model 350 described above may use one or more varieties of aerial images collected as the crop is approaching canopy closure to predict pest susceptibility 351. In some embodiments, the crop vigor map 331 may be computed using a normalized difference vegetation index (NDVI), a normalized difference red edge (NDRE) index, and/or a modified chlorophyll absorption ratio index 2 (MCARI2). In other embodiments, the crop vigor map 311 may be computed from a thermal image using a correlation computed as in FIG. 11.

In some embodiments of the present invention, the risk model 350 described above may use a thermal image collected as the crop is approaching canopy closure to predict pest susceptibility 351. For some embodiments, the crop vigor map 311 may be computed from the thermal image using a correlation computed as in FIG. 11.

Figure 13A:
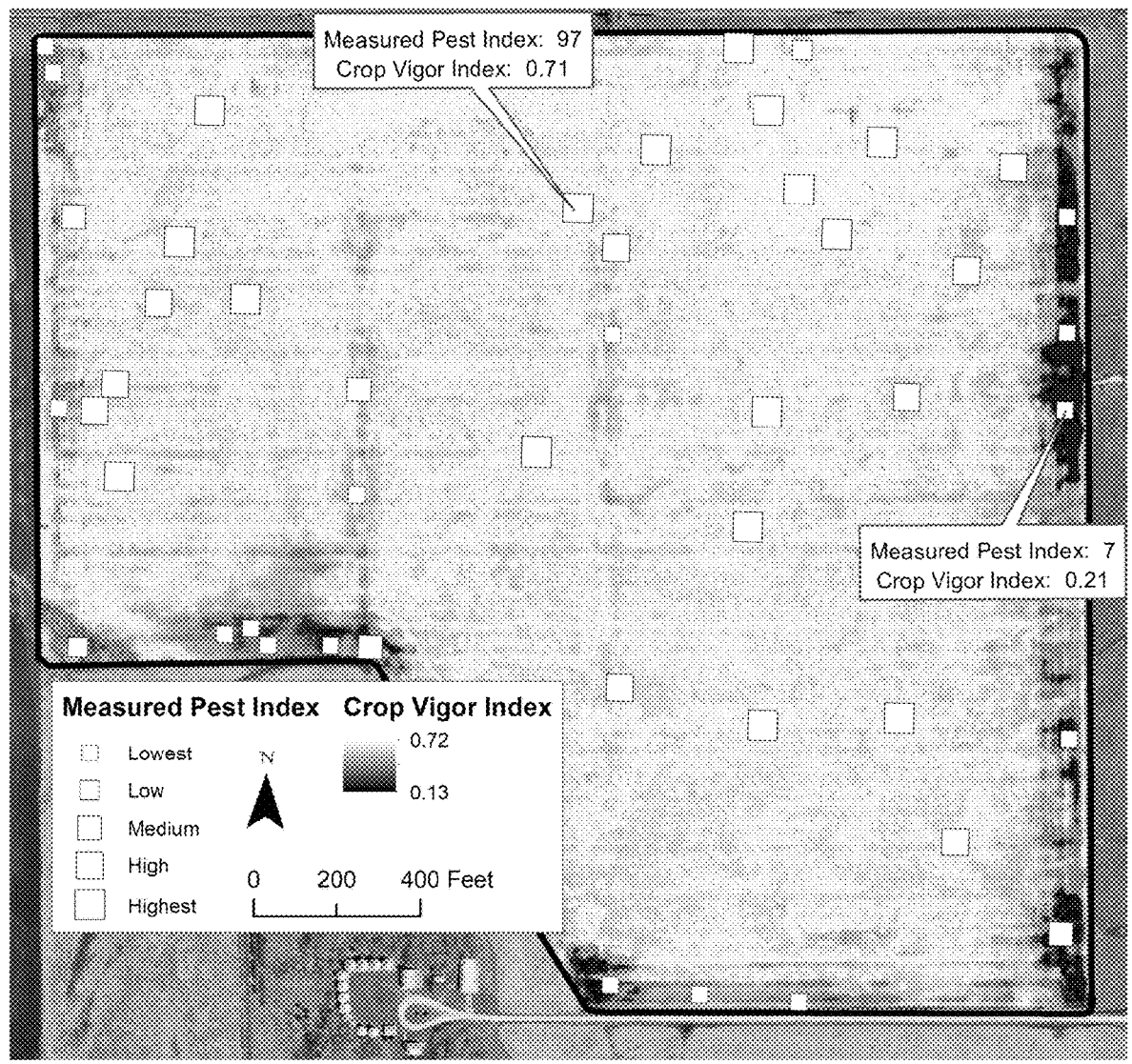
FIG. 13A shows an illustrative example of a crop vigor map with an overlay of sample measured pest (white mold) index data points, according to one embodiment of the present invention.

FIG. 13A shows an illustrative example of a crop vigor index map (i.e., crop vigor map) with an overlay of sample measured pest index data points, where the pest in this case is white mold. In FIG. 13A, the crop vigor index on the map is darker (i.e., black) for low vigor and lighter (i.e., white) for high crop vigor. The pest index is measured on the field. The points in the field where measured pest index (e.g., disease severity scale) are higher are indicated by larger white squares, whereas the points where the pest severity is lower or absent are indicated by the smaller white squares. For the case of white mold in this particular crop, FIG. 13A illustrates that a high measured pest index occurs where crop vigor index is high. Therefore, white mold is more likely (high pest index) in denser canopy (high crop vigor index).

In some embodiments, the map and data points of FIG. 13A may be used in the training and calibration of the risk model 350, as it links the points in the field where the pest index (e.g., disease severity scale) is high, low, or absent, with the corresponding crop vigor index. Therefore, data such as FIG. 13A may constitute training data 950 to be used as ground-truth data for training the machine learning module of FIG. 8, in certain embodiments of the present invention.

Figure 13B:
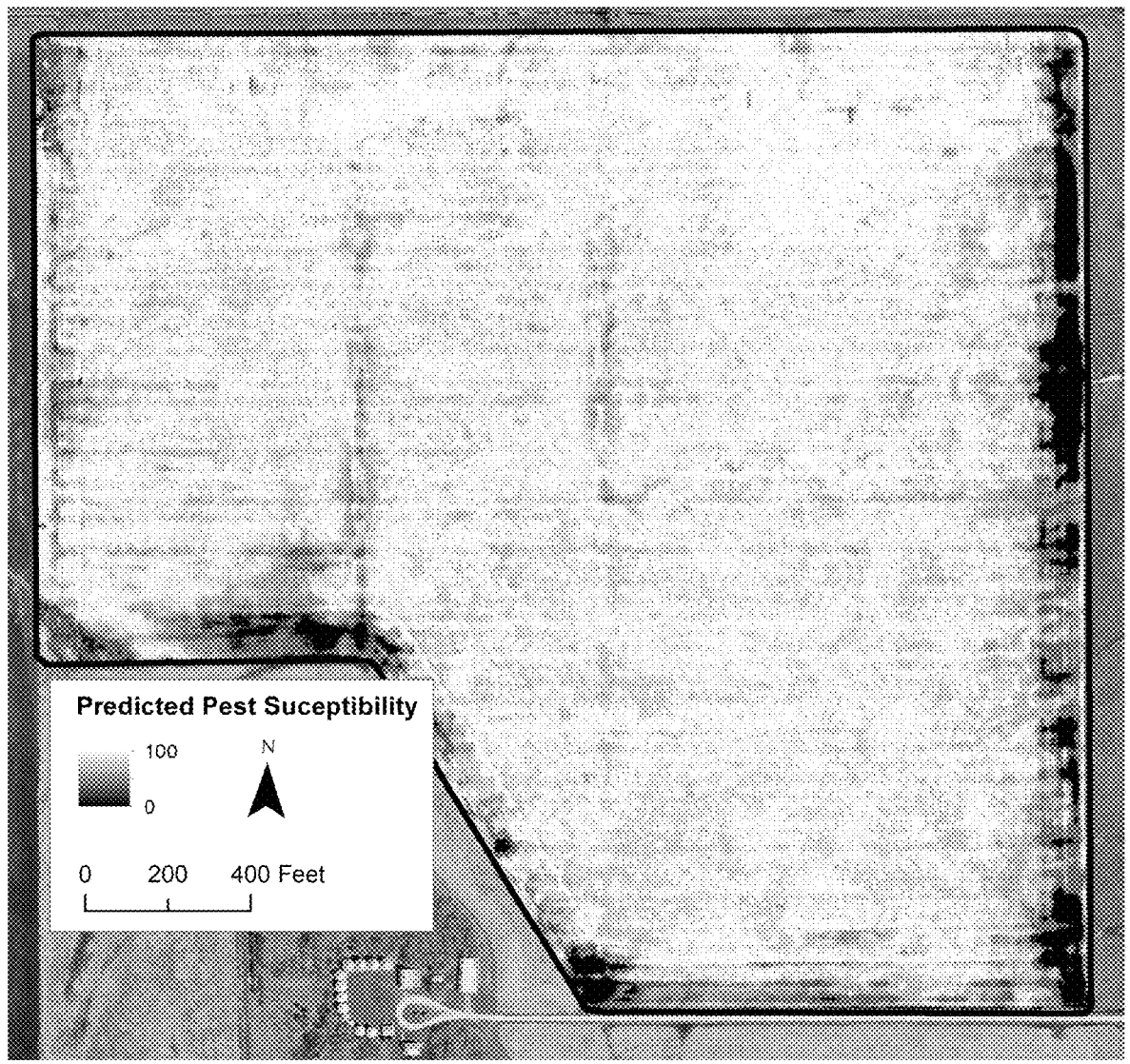
FIG. 13B shows a predicted pest susceptibility map for the example crop field of FIG. 13A, according to one embodiment of the present invention.

FIG. 13B shows the predicted pest susceptibility map for the example crop field of FIG. 13A. FIG. 13B therefore illustrates a sample output 351 of the risk model 350. The risk model used to generate the pest susceptibility map of FIG. 13B is a model where an in-season crop vigor index is used with the locations of white mold in order to demonstrate proof of concept.

In FIG. 13B, the predicted pest susceptibility index is a predicted severity measure where 0 corresponds to "no disease" and 100 is considered "severe disease". With a functional resolution of 10 feet by 10 feet, the map areas showing a severe pest susceptibility of 100 indicate areas where white mold is likely to occur on every plant, whereas the map areas showing a low pest susceptibility of 0 indicate areas where no white mold is expected to occur on any plant.

Pest susceptibility predicted at one point in time depends on the subsequent macroclimate conditions seen by the crop field. In general, if the broader macroclimate conditions are suitable, the white areas would have 100% probability of disease occurrence. On the other hand, if the broader macroclimate conditions are less suitable, the white areas would still have a high (around 70%) probability of disease. Conversely, the black areas would have 0% probability of disease, in many cases, regardless of the broader macroclimate conditions. This illustrates that accurate pest susceptibility maps such as the one in FIG. 13B have crucial implications on treatment management, planning, and efficiency.

It is important to note that the effect of a shift (e.g., increase) in a crop field parameter such as canopy closure, or an indicator such as crop vigor index, on any given pest, may depend on the pest. For example, an increase in crop vigor is likely to lead to an increased susceptibility to white mold, as demonstrated in the maps of FIGS. 13A and 13B. However, the same increase in crop vigor may lead to reduced susceptibility to weed and other pests requiring sun exposure.

As mentioned above, the various embodiments of the present invention apply to any pest, including crop diseases, insects, weeds, and plant pathogens.

Illustrative Sources for Geospatial Image Data and Microclimate Data

The geospatial image data (101, 112, 205, 301, 401) and microclimate data (104, 122, 205, 330, 401) used as inputs to the processes described herein may be received from remote sensors located on aircraft. The aircraft may be manned or unmanned with the unmanned aircraft controlled by a ground-based operator or flying autonomously along a programmed flight path. The data may be mosaicked into a single map or image in any suitable manner, where the map provides a pixel value for a plurality of geographically referenced locations in the field. The geographically referenced locations may be referenced relative to any suitable reference frame, including global coordinates, or to a field-specific local reference frame or plant identifier. The term "image" or "map", as used herein, does not necessarily require or imply a 2-dimensional representation and refers simply to data having a referenced position and a value associated with that position, thereby containing the information of a two-dimensional map without requiring an actual two-dimensional representation.

Aerial imagery may be obtained using one or more cameras mounted on a manned or unmanned aerial vehicle, preferably over a short period of time near mid-day, although any suitable method may be used without departing from various aspects of the invention. The images should be acquired over as short a period as possible so that environmental conditions do not significantly change between the beginning and end of a data-acquisition flight. To minimize flight time while covering typical agricultural areas, the flight altitude should be at least 200 meters. For accurately extracting aerial measurements at the locations of ground samples, individual images are mosaicked, and the mosaic is geo-registered and orthorectified.

In other embodiments, images are taken from satellites, and a similar process is followed for image processing as for aerial images.

In another aspect, the microclimate parameters may be collected by the same aircraft taking the thermal images. In some embodiments, the aircraft may measure the microclimate parameter(s) during a pass over the field at a lower elevation than when taking the thermal image(s) that may be above 200 meters in altitude, and on the same day as the thermal images were collected. In other embodiments, the microclimate parameters are estimated using models or "synthetic sensors" derived from broader microclimate or weather models.

In some embodiments, ground-based microclimate measurements may be used without departing from the scope of the present invention. Microclimate parameters may also be obtained from third parties, such as third-party weather stations, whether ground-based or remote.

Treatment Plan Implementation

In some embodiments, the sprayers used in precision agriculture may incorporate engineering that allows growers to execute the process at a fine scale (i.e., individual nozzle control for on/off spray applications at a 20 inch spacing). As an example, flow control may be performed at the individual nozzle level, which would allow the application of different fungicide/spray rates at a 20 inch spacing. This process would take into account the spatial variability of canopy vigor in a closed canopy. In one embodiment, the treatment plan generates a control protocol for these spray nozzles. Therefore, heavy rates of fungicide/spray would generate a high ROI where canopy is closed and the most vigorous. And fungicide/spray rates could be decreased substantially (but not eliminated or turned off) in other parts of the field where canopy is closed, but far less vigorous, saving money for growers.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks, which include Compact Disk Read-Only Memory (CD ROMS), Digital Versatile Disks (DVDs), etc., as well as digital and analog communication media.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user in a client-server environment is accommodated to practice the methods of the present invention.

CONCLUSIONS

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention as defined by the appended claims.

What is claimed is:

1. A system comprising a hardware processor and a non-transitory storage medium for storing program code, the program code executable by the hardware processor to execute a process for predicting a pest susceptibility, the program code when executed by the hardware processor causing the hardware processor to execute steps to:
   receive geospatial image data of a crop field from one or more sensors, wherein the geospatial image data of the crop field is geocoded by longitude and latitude coordinates;
   calculate a degree of canopy closure from the geo spatial image data for one or more portions of the crop field;
   receive microclimate data of the crop field, wherein the microclimate data comprises locally variable environmental conditions in the one or more portions of the crop field; and
   generate a pest susceptibility index in the one or more portions of the crop field from the geospatial image data utilizing a risk model, wherein the pest susceptibility index is generated based on both the degree of canopy closure of the crop field and the microclimate data in the one or more portions of the crop field, and wherein the pest susceptibility index is a measure of a susceptibility of a crop in the crop field to one or more crop pests.

2. The system of claim 1, wherein the calculating the degree of canopy closure from the geospatial image data for the one or more portions of the crop field utilizes a first machine vision algorithm executable by the hardware processor.

3. The system of claim 2, wherein the first machine vision algorithm comprises one or more deep learning neural networks, and wherein the deep learning neural networks are trained on ground truth data comprising geospatial image data of one or more sample crop fields and one or more degrees of canopy closure for the one or more sample crop fields.

4. The system of claim 1, wherein the degree of canopy closure for the one or more portions of the crop field is calculated using machine data received from agricultural equipment.

5. The system of claim 1, wherein the degree of canopy closure for the one or more portions of the crop field is calculated using a crop row spacing of the crop field, and wherein the crop row spacing is estimated from the geospatial image data using a second machine vision algorithm or received from machine data from one or more agricultural equipment.

6. The system of claim 1, wherein the degree of canopy closure for the one or more portions of the crop field is calculated using an irrigation status of the crop field, wherein the irrigation status is estimated using geospatial image data or received from machine data from one or more irrigation equipment.

7. The system of claim 1, wherein the degree of canopy closure for the one or more portions of the crop field is calculated using a crop stage of the crop field, and wherein the crop stage is determined from physical observation or one or more crop models.

8. The system of claim 1, wherein the risk model is a machine learning algorithm executable by the hardware processor, and wherein the machine learning algorithm is trained on ground truth data comprising one or more sample pest data points and one or more sample degrees of canopy closure for one or more sample crop fields.

9. The system of claim 8, wherein the machine learning algorithm comprises one or more of a linear regressor, a nonlinear regressor, a random forest algorithm, and a neural network.

10. The system of claim 1, wherein the crop pest is selected from the group consisting of crop diseases, insects, weeds, and plant pathogens.

11. The system of claim 1, wherein the geospatial image data is selected from the group consisting of aerial imagery, satellite imagery, and unmanned aircraft system (UAS) imagery, and wherein the one or more sensors are infrared cameras.

12. The system of claim 1, wherein the one or more sensors are located on a machine selected from the group consisting of an unmanned aerial vehicle (UAV), an unmanned aircraft system (UAS), an aircraft, a satellite, and a field equipment.

13. The system of claim 1, wherein the microclimate data is generated from the group consisting of one or more in-field measurements, one or more aerial measurements, one or more satellite measurements, one or more drone measurements, one or more remote sensor measurements, one or more weather models, and one or more microclimate models.

14. The system of claim 1, further comprising program code to:
generate a treatment plan based on the pest susceptibility index in the one or more portions of the crop field, wherein the treatment plan comprises an agricultural management technique, comprising application of one or more agricultural chemicals, to prevent outbreak or control propagation of one or more crop pests.

15. The system of claim 1, further comprising program code to:
receive price information for a crop growing in the crop field, a cost information for one or more agricultural management techniques, and an anticipated efficacy for the one or more agricultural management techniques; and
generate an anticipated return on investment (ROI) based on the price and cost information and the anticipated efficacy.

16. A computer-implemented method for predicting a pest susceptibility, the computer-implemented method executable by a hardware processor, the method comprising:
receiving geospatial image data of a crop field from one or more sensors, wherein the geospatial image data of the crop field is geocoded by longitude and latitude coordinates; calculating a degree of canopy closure from the geospatial image data for one or more portions of the crop field;
receiving microclimate data of the crop field, wherein the microclimate data comprises locally variable environmental conditions in the one or more portions of the crop field; and
generating a pest susceptibility index in the one or more portions of the crop field from the geospatial image data utilizing a risk model, wherein the pest susceptibility index is generated based on both the degree of canopy closure of the crop field and the microclimate data in the one or more portions of the crop field, and wherein the pest susceptibility index is a measure of a susceptibility of a crop in the crop field to one or more crop pests.

17. The computer-implemented method of claim 16, wherein the calculating the degree of canopy closure from the geospatial image data for the one or more portions of the crop field utilizes a first machine vision algorithm executable by the hardware processor.

18. The computer-implemented method of claim 17, wherein the first machine vision algorithm comprises one or more deep learning neural networks, and wherein the deep learning neural networks are trained on ground truth data comprising geospatial image data of one or more sample crop fields and one or more degrees of canopy closure for the one or more sample crop fields.

19. The computer-implemented method of claim 16, wherein the degree of canopy closure for the one or more portions of the crop field is calculated using machine data received from agricultural equipment.

20. The computer-implemented method of claim 16, wherein the degree of canopy closure for the one or more portions of the crop field is calculated using a crop row spacing of the crop field, and wherein the crop row spacing is estimated from the geospatial image data using a second machine vision algorithm or received from machine data from one or more agricultural equipment.

* * * * *